(12) United States Patent
Muraoka

(10) Patent No.: US 6,708,584 B2
(45) Date of Patent: Mar. 23, 2004

(54) BICYCLE PEDAL ASSEMBLY

(75) Inventor: Tsutomu Muraoka, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/954,435

(22) Filed: Sep. 18, 2001

(65) Prior Publication Data

US 2003/0051574 A1 Mar. 20, 2003

(51) Int. Cl.$^7$ ................................................ G05G 1/14
(52) U.S. Cl. .................................... 74/594.6; 74/594.4
(58) Field of Search .......................... 74/594.1, 594.4, 74/594.6; 36/131, 132, 134

(56) References Cited

U.S. PATENT DOCUMENTS

| | | | |
|---|---|---|---|
| 4,506,463 A | 3/1985 | Chassaing | 36/131 |
| 4,686,867 A | 8/1987 | Bernard et al. | 74/594.6 |
| 4,739,564 A | 4/1988 | Eser | 36/131 |
| 4,762,019 A | 8/1988 | Beyl | 74/594.6 |
| 4,827,797 A | 5/1989 | Le Faou et al. | 74/594.6 |
| 4,882,946 A | 11/1989 | Beyl | 74/594.6 |
| 5,131,291 A | 7/1992 | Beyl | 74/594.6 |
| 5,142,938 A * | 9/1992 | Sampson | 74/594.6 |
| 5,203,229 A | 4/1993 | Chen | 74/594.6 |
| 5,417,128 A | 5/1995 | Beyl | 74/594.6 |
| 5,423,233 A | 6/1995 | Peyre et al. | 74/594.6 |
| 5,505,111 A * | 4/1996 | Nagano | 74/594.6 |
| 5,557,985 A * | 9/1996 | Nagano | 74/594.6 |
| 5,697,262 A * | 12/1997 | Chen | 74/594.6 |
| 5,727,429 A | 3/1998 | Ueda | 74/594.6 |
| 5,931,053 A | 8/1999 | Chen | 74/594.6 |
| 5,992,266 A * | 11/1999 | Heim | 74/594.6 |
| 6,112,620 A | 9/2000 | Chen | 74/594.6 |
| 6,170,357 B1 | 1/2001 | Chen | 74/594.6 |
| 6,244,136 B1 * | 6/2001 | Chen | 74/594.6 |

FOREIGN PATENT DOCUMENTS

EP 0542238 B1 4/1995

* cited by examiner

Primary Examiner—David Fenstermacher
(74) Attorney, Agent, or Firm—Shinjyu Global IP Counselors, LLP

(57) ABSTRACT

A bicycle pedal assembly includes a pedal and a cleat. The pedal includes a body that rotates about a shaft. Front and rear clamping member are coupled to opposite ends of the pedal body. Each of the clamping members has an engagement surface facing in a first direction. The cleat has front and rear attachment portions that are selectively engageable with the pedal via the front and rear clamping members. Specifically, the front and rear attachment portions have front and rear offset coupling surfaces engageable with the front and rear engagement surfaces. The pedal and the cleat are configured to form a rear float pivot axis on a rear side of a center rotation axis of the pedal and a front cleat release pivot axis on a front side of the center rotation axis.

40 Claims, 15 Drawing Sheets

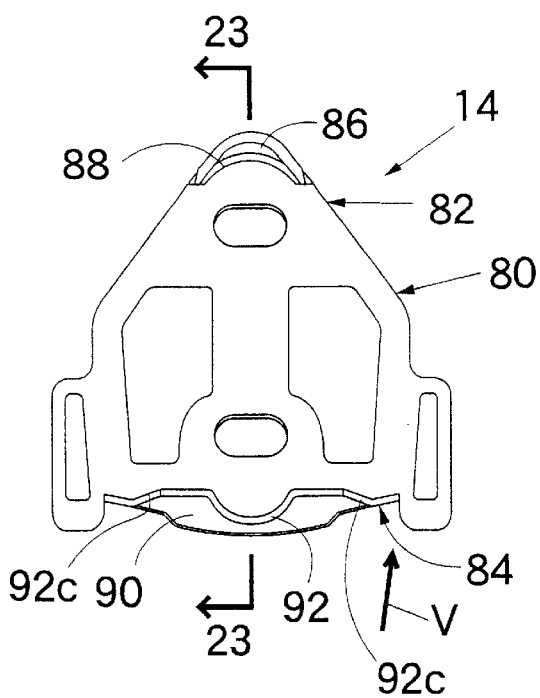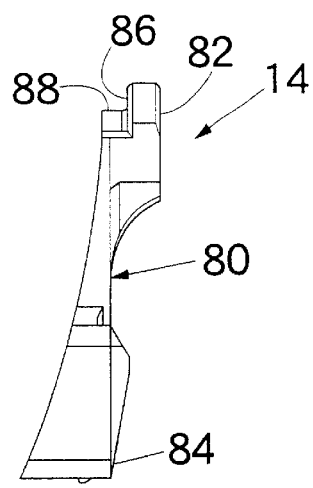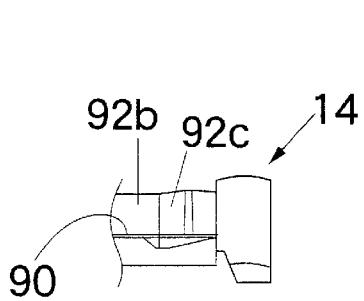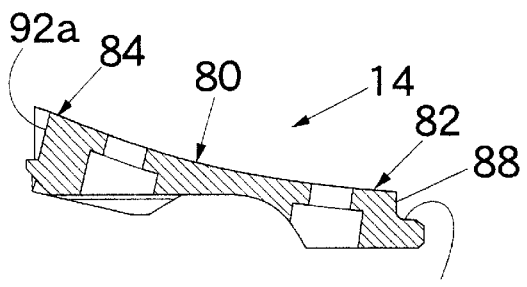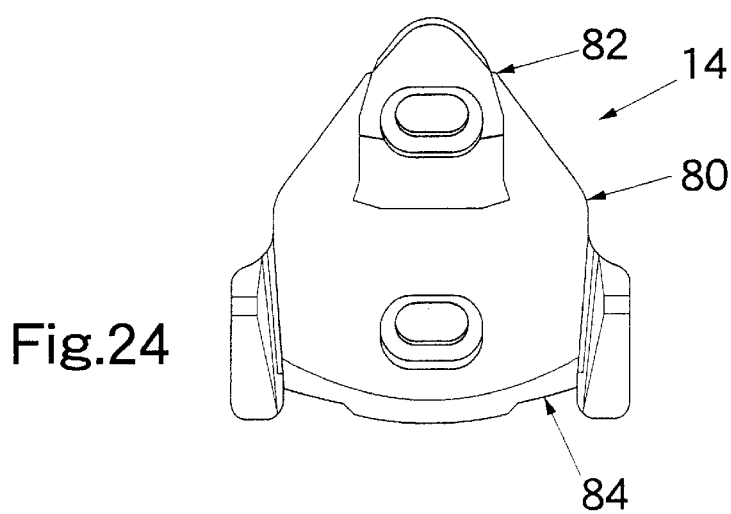

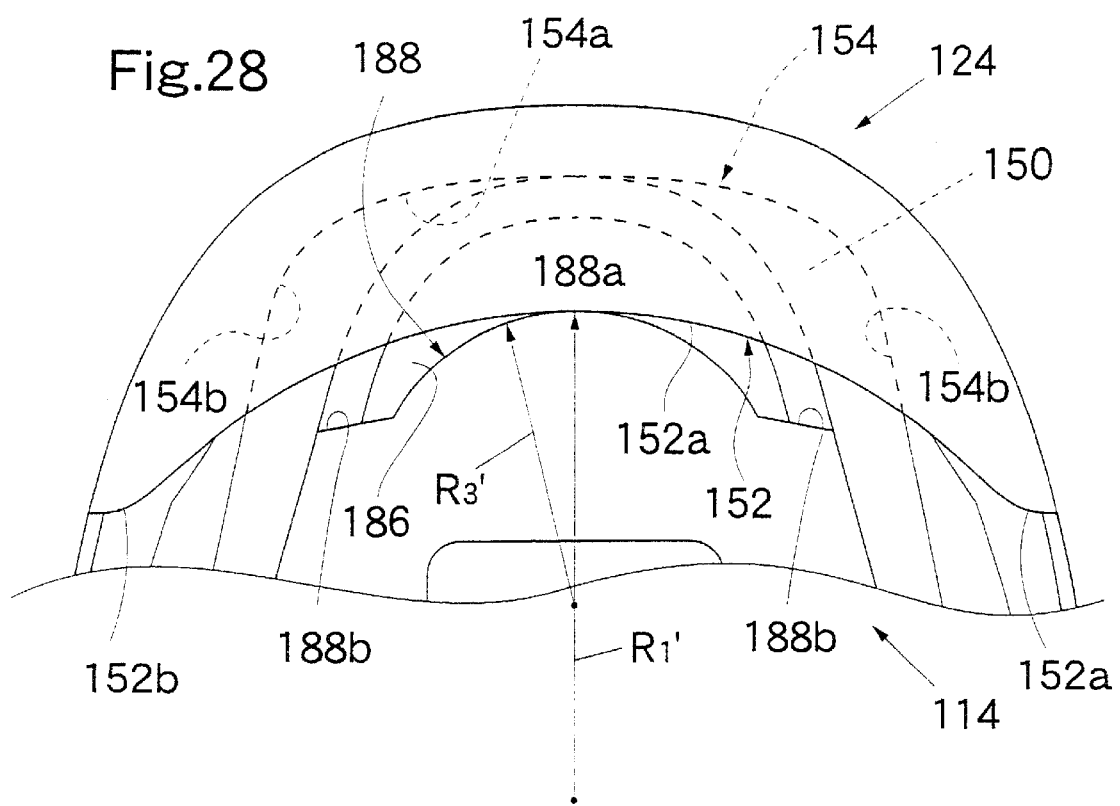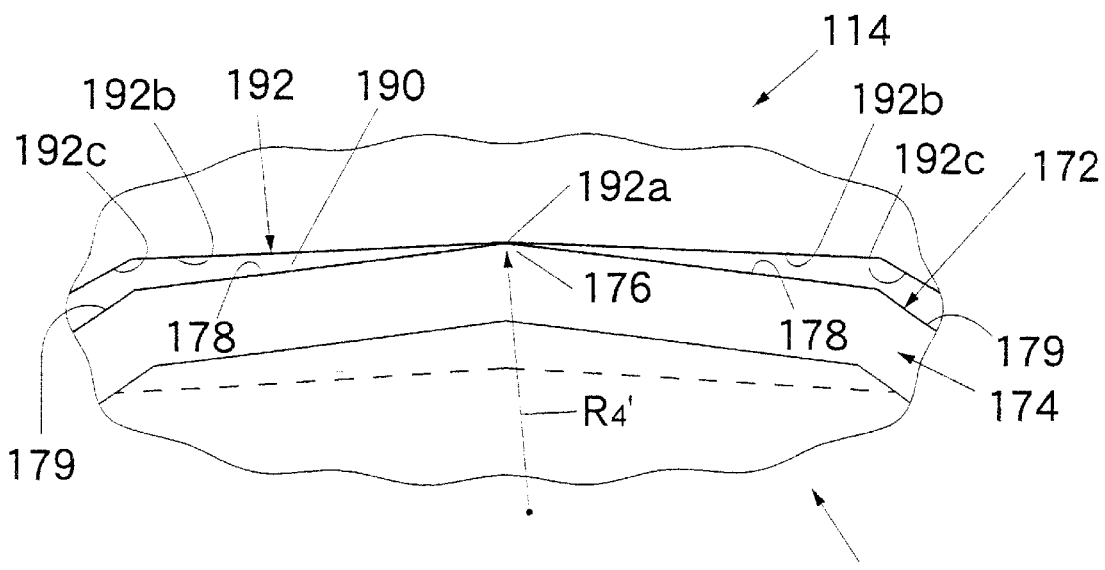

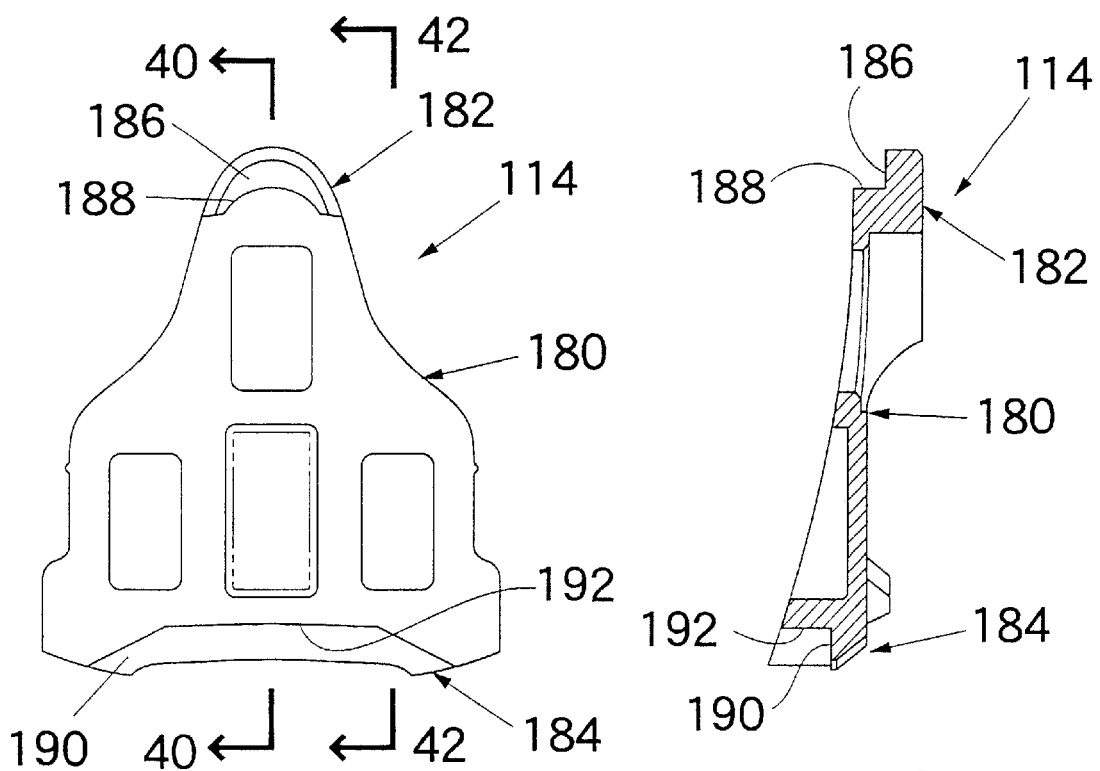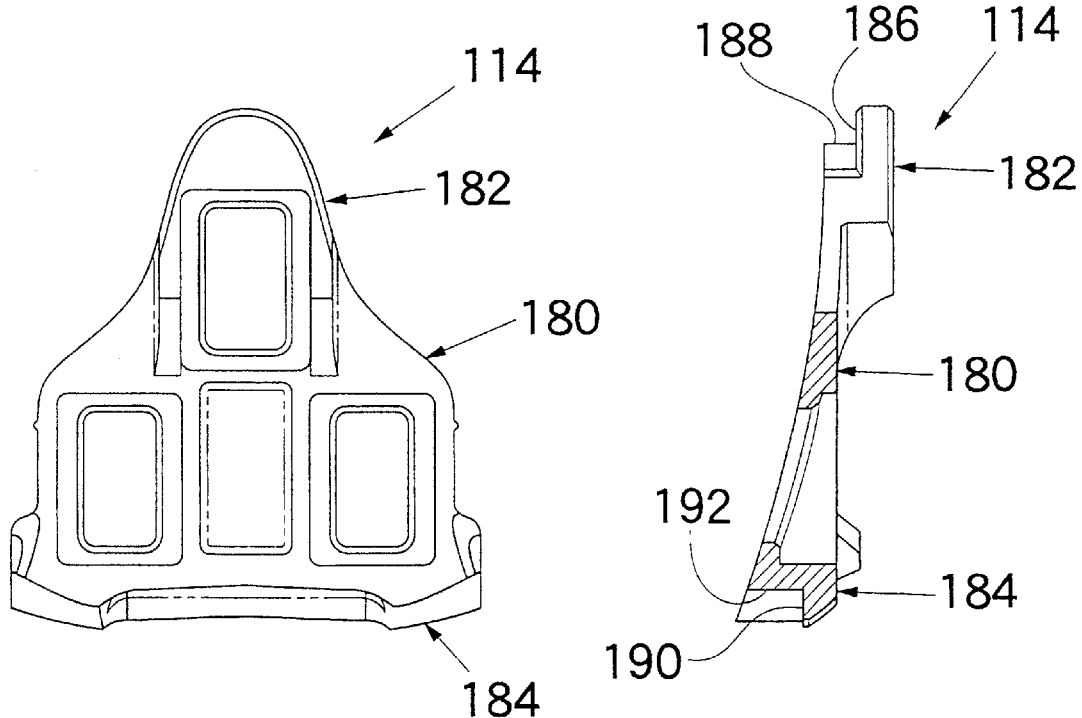

BICYCLE PEDAL ASSEMBLY

BACKGROUND OF THE INVENTION

1. Field of the Invention

This invention generally relates to a bicycle pedal assembly. More specifically, the present invention relates clipless or step-in bicycle pedal assembly, which has a rear float pivot axis for relative rotation of the cleat and pedal.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle pedal.

In recent years, bicycle pedals have been designed for specific purposes such as for pleasure, off road biking, road racing, etc. One particular type of bicycle pedal, which is gaining more popularity, is the step-in or clipless pedal, which releasably engages a cleat secured to the sole of a cyclist's shoe. The clipless pedal has a pedal spindle that can be mounted on the crank of a bicycle, a pedal body that is rotatably supported on this pedal spindle, and a cleat engagement mechanism. In an off road bicycle pedal a cleat engagement mechanism is formed on both sides of the pedal body for engaging a cleat. A road-racing pedal, on the other hand, typically only has a cleat engagement mechanism on one side of the pedal body. In either case, in these types of bicycle pedals, the rider steps onto the pedal and the cleat engagement mechanism automatically grips on to the cleat secured to the bottom of the cyclist's shoe.

When attaching the cyclist's shoe to the step-in or clipless pedal via the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

Typically, these step-in or clipless pedals and the cleats for these pedals are designed to allow a limited amount of play or float between the pedal and the cleat (while engaged), but prior to disengagement. When releasing the shoe from the pedal, the cyclist will typically turn the shoe about an axis FP perpendicular or approximately perpendicular to the tread of the pedal, using the front end of the cleat as a pivoting point. As a result of this pivoting action, the rear hook or clamping member is pivoted rearwardly against the force of the spring to a cleat releasing position to release the shoe.

With this type of step-in or clipless pedal, the shoe and the pedal are in a state of constant engagement when the cleat is engaged in the cleat clamping members, so the pedaling force can be transmitted efficiently to the pedals. As a result, step-in or clipless pedals are widely employed on racing bicycles used in road racing and mountain bike racing.

However, these step-in or clipless pedals can be complicated and expensive to manufacture and assemble. Additionally, these step-in or clipless pedals can become clogged with mud and or debris making engagement/disengagement difficult. Moreover, some of these step-in or clipless pedal sometimes do not transfer power to the bicycle crank arms in the most efficient manner. Finally, these step-in or clipless pedal can be uncomfortable and cause fatigue to the riders foot after extended riding periods.

In view of the above, there exists a need for a bicycle pedal assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide a step-in bicycle pedal assembly that is relatively easy to assemble and disassemble.

Another object of the present invention is to provide a step-in bicycle pedal assembly that is relatively simple and inexpensive to manufacture.

Another object of the present invention is to provide a step-in bicycle pedal assembly that is relatively lightweight and malfunction free.

Still another object of the present invention is to provide a step-in bicycle pedal assembly that has a rear floating pivot axis.

The foregoing objects can basically be achieved by providing a bicycle pedal assembly comprising a bicycle pedal and a bicycle cleat. The bicycle pedal includes a pedal shaft, a pedal body, a front clamping member and a rear clamping member. The pedal shaft has a first end adapted to be coupled-to a bicycle crank and a second end with a center rotation axis extending between the first and second ends. The pedal body is rotatably coupled to the second end of the pedal shaft about the center rotation axis of the pedal shaft and has a first end and a second end. The front clamping member is coupled to the first end of said pedal body and has a front cleat engagement surface facing in a first direction. The rear clamping member is coupled to the second end of the pedal body and has a rear cleat engagement surface facing in the first direction. The rear cleat engagement surface is offset from the front cleat engagement surface. The bicycle shoe cleat is selectively engageable with the pedal body via the first and second clamping members and includes a front attachment portion, a rear attachment portion and a connecting portion. The front attachment portion has a front coupling surface selectively engageable with the front engagement surface of the front clamping member. The rear attachment portion has a rear coupling surface selectively engageable with the rear engagement surface of the rear clamping member. The connecting portion connects the front and rear attachment portions together. The front and rear clamping members and the front and rear attachment portions are configured to form a rear float pivot axis on a rear side of the center rotation axis and a front cleat release pivot axis on a front side of the center rotation axis when the cleat and the pedal are coupled together. The rear float pivot axis is substantially perpendicular to the rear cleat engagement surface.

The foregoing objects can also basically be achieved by providing bicycle pedal comprising a pedal shaft, a pedal body, a front clamping member and a rear clamping member. The pedal shaft has a first end adapted to be coupled to a bicycle crank and a second end with a center rotation axis extending between the first and second ends. The pedal body is rotatably coupled to the second end of the pedal shaft about the center rotation axis of the pedal shaft and has a first end and a second end. The front clamping member is coupled to the first end of the pedal body. The front clamping member has a front cleat engagement surface facing in a first direction and a front cleat control surface extending substantially perpendicular to the front cleat engagement surface. The rear clamping member is coupled to the second end of the pedal body. The rear clamping member has a rear cleat engagement surface facing in the first direction and a rear cleat control surface extending substantially perpendicular to the rear cleat engagement surface. The rear cleat engagement surface is offset from the front cleat engagement surface. The front and rear cleat control surfaces and the front and rear cleat engagement surfaces are configured to form a rear float pivot axis on a rear side of the center rotation axis and a front cleat release pivot axis on a front side of the center rotation axis.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 20 is a top plan view of the cleat of the bicycle pedal assembly illustrated in FIGS. 1–5 and 6–12;

FIG. 21 is a side elevational view of the cleat illustrated in FIG. 20;

FIG. 22 is a partial rear elevational view of the cleat illustrated in FIGS. 20 and 21, as seen along arrow V of FIG. 20;

FIG. 23 is a cross-sectional view of the cleat illustrated in FIGS. 20–22, as seen along section line 23—23 of FIG. 20;

FIG. 24 is a bottom plan view of the cleat illustrated in FIGS. 20–23;

FIG. 28 is an enlarged, top plan view of the front portion of the cleat coupled to the front portion of the pedal of the bicycle pedal assembly illustrated in FIGS. 25–27;

FIG. 29 is an enlarged, top plan view of the rear portion of the cleat coupled to the rear portion of the pedal of the bicycle pedal assembly illustrated in FIGS. 25–27;

FIG. 39 is a top plan view of the cleat of the bicycle pedal assembly illustrated in FIGS. 25–31;

FIG. 40 is a cross-sectional view of the cleat illustrated in FIG. 39, as seen along section line 40—40 of FIG. 39;

FIG. 41 is a bottom plan view of the cleat illustrated in FIGS. 39 and 40; and

FIG. 42 is a cross-sectional view of the cleat illustrated in FIGS. 39–41, as seen along section line 42—42 of FIG. 39.

DETAILED DESCRIPTION OF THE PREFERRED EMBODIMENTS

Figure 1:
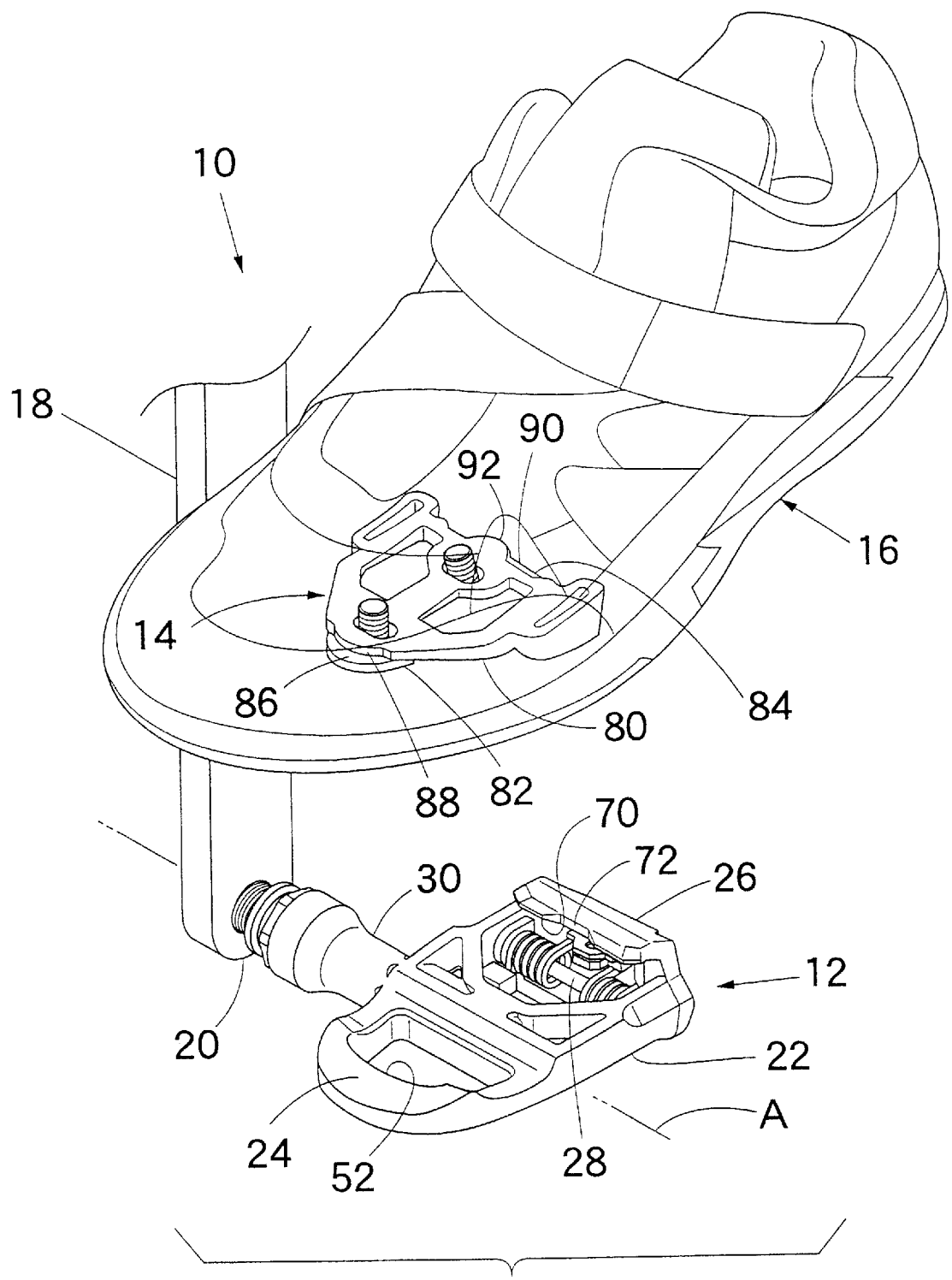
FIG. 1 is a partially exploded, perspective view of a bicycle pedal assembly in accordance with a preferred embodiment of the present invention.
Figure 2:
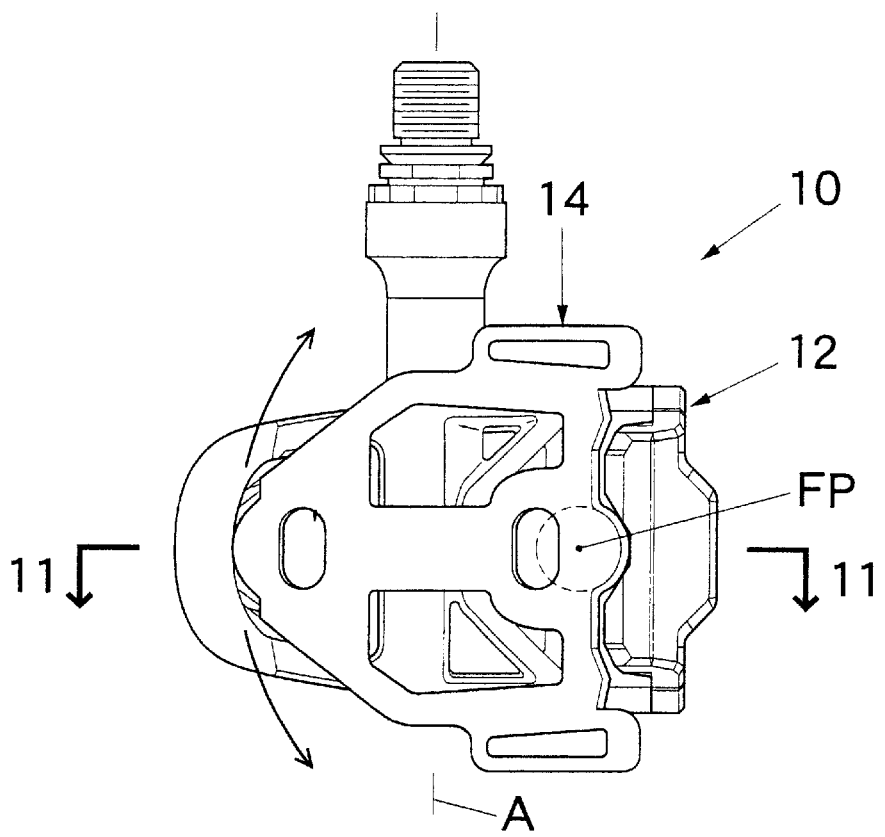
FIG. 2 is an enlarged, top plan view of the bicycle pedal assembly illustrated in FIG. 1, with the cleat coupled to the pedal and removed from the shoe.
Figure 3:
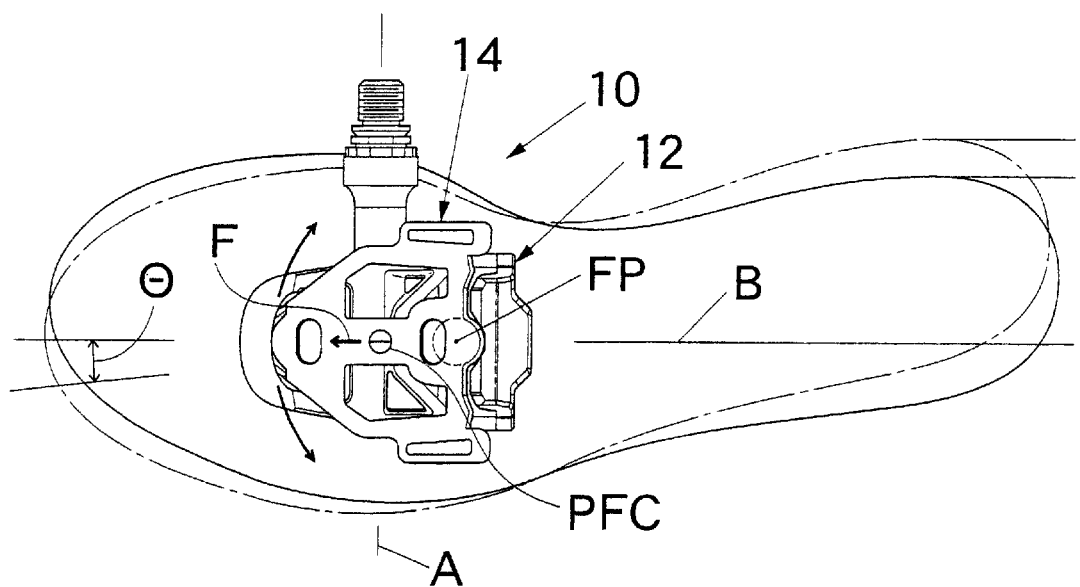
FIG. 3 is a top plan view of the bicycle pedal assembly illustrated in FIGS. 1 and 2, with the cleat coupled to the pedal and the float of the shoe shown in broken lines.

Referring initially to FIGS. 1–3, a bicycle pedal assembly 10 is illustrated in accordance with the first embodiment of the present invention. The bicycle pedal assembly 10 is designed with a rear floating pivot axis FP. The bicycle pedal assembly 10 is a clipless or step-in pedal assembly that basically includes a bicycle pedal 12 and a cleat 14 selectively releasably coupled to the bicycle pedal 12. The cleat 14 is preferably fixedly coupled to a bicycle shoe 16 to releasably couple the cyclist's foot to the bicycle pedal 12. The bicycle pedal 12 and the cleat 14 are designed such that the cleat 14 floats (or rotates) relative to the bicycle pedal 12 about the rear floating pivot axis FP when the cleat 14 and the pedal 12 are coupled together. Thus, a desired degree or angle θ of float can be attained without interference from other parts of the bicycle. In the illustrated embodiment, the pedal 12 and the cleat 14 are configured such that the cleat 14 floats around the rear float pivot axis FP for about three degrees in each direction as measured from a center longitudinal axis B that passes through the rear float pivot axis FP. The bicycle pedal assembly 10 is also designed to be relatively simple and inexpensive to manufacture and assemble.

The bicycle pedal assembly 10 is especially designed for use with road bicycles as opposed to use with an off-road bicycle. However, it will be apparent to those skilled in the art from this disclosure that the features of the bicycle pedal assembly 10 can be used in the construction of an off-road type of bicycle pedal assembly if needed and/or desired. In other words, it will be apparent that while the pedal 12 has one side designed to have the cleat 14 coupled thereto, that the principles of the present invention could be applied to a two-sided pedal. The bicycle pedal 12 is fixedly coupled to a bicycle crank arm 18 of a bicycle (not shown) for rotation therewith, as seen in FIG. 1. The bicycle pedal 12 illustrated is a left side pedal. Of course, the left side pedal 12 is the mirror image of the right side pedal (not shown). Thus, it will be apparent to those skilled in the art that the description of the left side pedal 12 also applies to a right side pedal.

Figure 11:
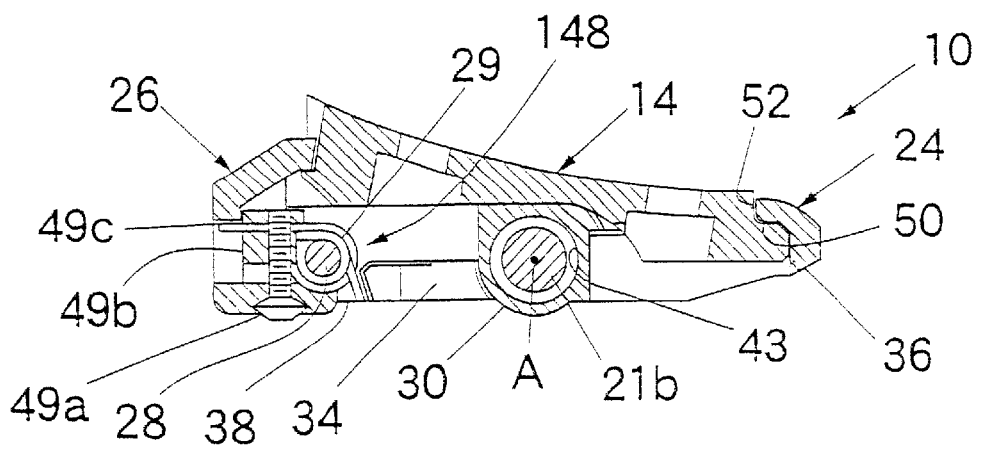
FIG. 11 is a cross-sectional view of the bicycle pedal assembly illustrated in FIGS. 1–3, 6 and 7, as seen along section line 11—11 of FIG. 2.
Figure 12:
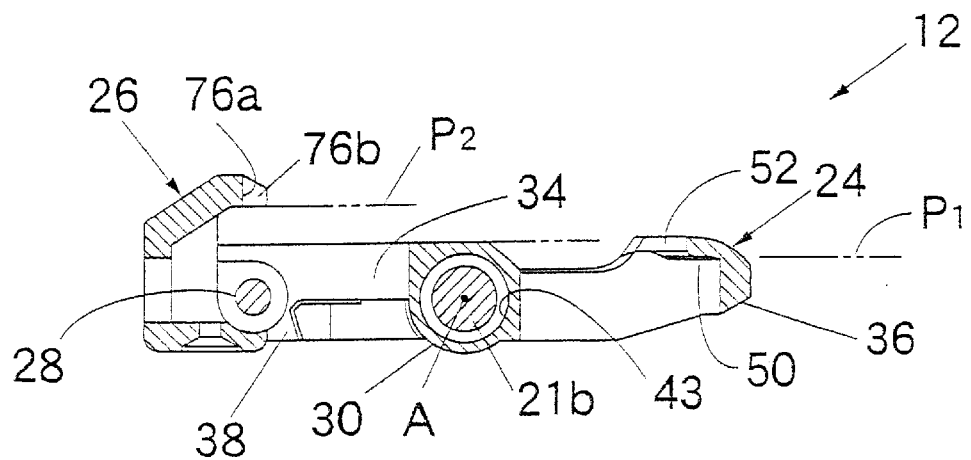
FIG. 12 is a cross-sectional view of the bicycle pedal illustrated in FIGS. 8 and 9, as seen along section line 12—12 of FIG. 8, with the biasing mechanism removed for the purpose of illustration.
Figure 13:
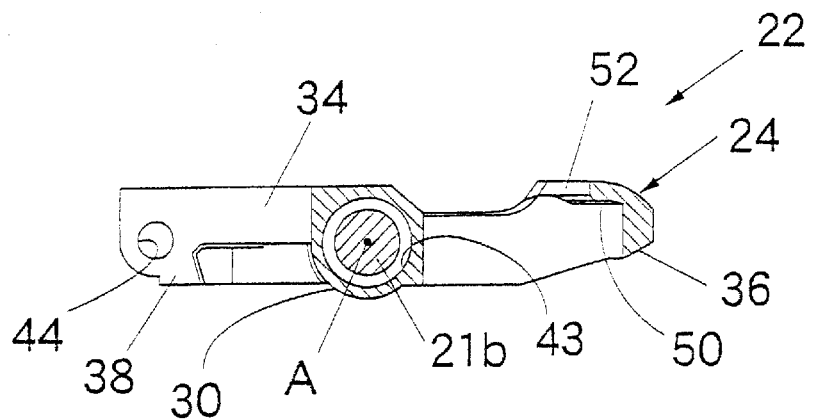
FIG. 13 is a cross-sectional view of the bicycle pedal illustrated in FIGS. 8 and 9, as seen along section line 12—12 of FIG. 8, with the rear clamping mechanism removed for the purpose of illustration.
Figure 14:
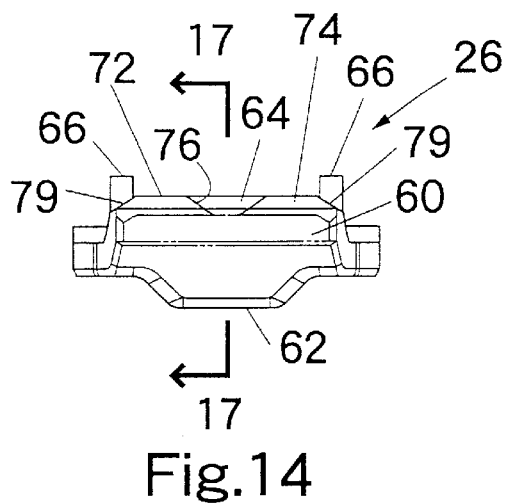
FIG. 14 is a top plan view of the rear clamping member of the bicycle pedal illustrated in FIGS. 1–3 and 6–12.
Figure 15:
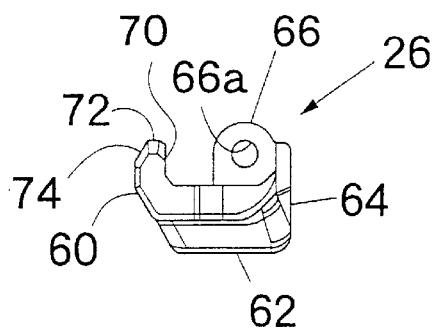
FIG. 15 is a side elevational view of the rear clamping member illustrated in FIG. 14.
Figure 16:
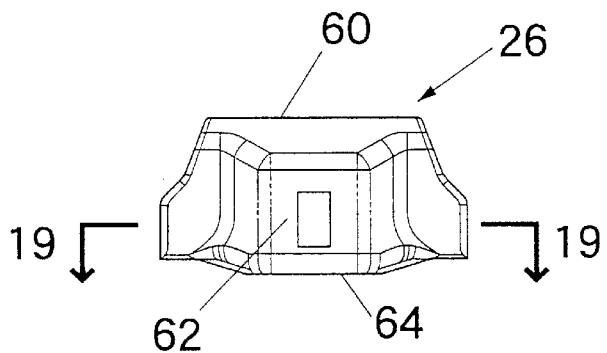
FIG. 16 is a rear elevational view of the rear clamping member illustrated in FIGS. 14 and 15.
Figure 17:
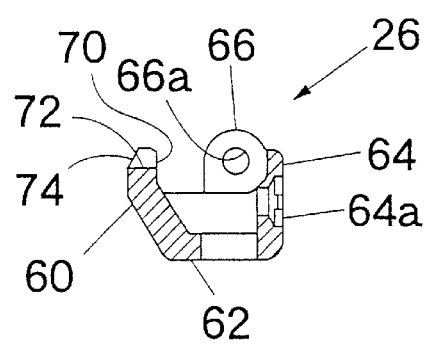
FIG. 17 is a cross-sectional view of the rear clamping member illustrated in FIGS. 14–16, as seen along section line 17—17 of FIG. 14.
Figure 18:
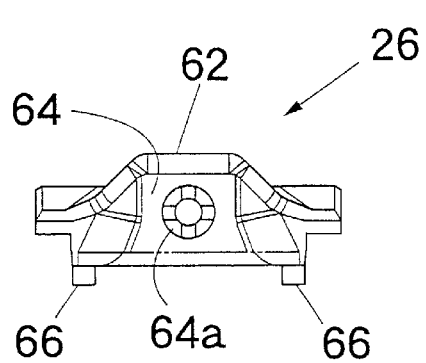
FIG. 18 is a bottom plan view of the rear clamping member illustrated in FIGS. 14–17.
Figure 19:
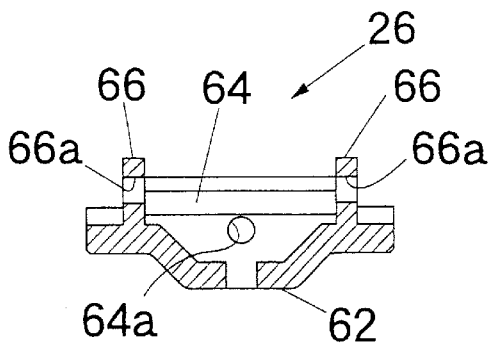
FIG. 19 is a cross-sectional view of the rear clamping member illustrated in FIGS. 14–18, as seen along section line 19—19 of FIG. 16.

As seen in FIGS. 1 and 8–10, the bicycle pedal 12 basically includes a pedal shaft or spindle 20, a pedal body 22, a front (first) clamping member 24 and a rear (second) clamping member 26. The front and rear clamping members 24 and 26 are preferably fixedly coupled to the pedal body 22, with the front clamping member 24 being fixed to the pedal body 22 and the rear clamping member 26 being pivotally coupled to the pedal body 22. The shaft 20 is adapted to be coupled to the crank arm 18, while the pedal body 22 is rotatably coupled to the shaft 20 for supporting a cyclist's foot. The pedal shaft 20 has a first end 21a that is fastened to the crank arm 18 and a second end 21b (shown in FIGS. 11–13) with the pedal body 22 rotatably coupled thereto. A center longitudinal axis A extends between the first and second ends 21a and 21b of the pedal shaft 20. The pedal body 22 is freely rotatable about the center longitudinal axis A. A cleat receiving area is formed on one side of the pedal body 22 for receiving and supporting the cleat 14 thereon. More specifically, the cleat receiving area is defined as the space located between the front and rear clamping members 24 and 26.

The pedal shaft 20 is preferably a multi-step spindle having several stepped portions that are rotatably coupled within a hollow area of the pedal body 22 in a conventional manner. The first end 21a of the pedal shaft 20 has threads formed thereon for fixedly coupling the pedal 12 to the crank arm 18 in a conventional manner. Preferably, the threads of the left pedal 12 are counter-clockwise threads such that the left pedal 12 remains coupled to crank arm 18 in a conventional manner. Alternatively, the threads of the right pedal shaft (not shown) are preferably clockwise threads such that the right pedal 12 remains coupled to an opposing crank arm (not shown) in a conventional manner. The second end 21b of the pedal shaft 20 rotatably supports the pedal body 22 about the longitudinal axis A by a conventional bearing assembly (not shown).

In particular, the pedal shaft 20 is secured within the hollow area of pedal body 22 by an inner tube and a lock nut in a conventional manner. More specifically, the pedal shaft 20 has the lock nut mounted thereon to secure a bearing assembly and the pedal shaft 20 within the hollow area of the pedal body 22. Since these parts are relatively conventional parts and the specific constructions of these parts are not critical to the present invention, they will not be discussed or illustrated in detail herein. Rather, these parts will only be discussed as necessary to understand the present invention.

The front clamping member 24 is fixedly coupled to the pedal body 22, while the rear clamping member 26 is pivotally coupled to the pedal body 22. More specifically, the front clamping member 24 is preferably a non-movable member that is integrally formed with the pedal body 22, while the rear clamping member 26 is preferably a separate member mounted on a pivot pin or support pin 28. The pivot pin 28 is coupled to the pedal body 22. Two torsion springs 29 are preferably coupled between the pedal body 22 and the rear clamping member 26. While two springs 29 are preferably mounted on the pivot pin 28, it will be apparent to those skilled in the art from this disclosure that fewer or more springs can be used. Moreover, it will be apparent to those skilled in the art the other types of urging member(s)/resilient member(s) could be utilized to carry out the present invention. Accordingly, the term "biasing member" as used herein refers to one or more members that applies an urging force between two elements.

Figure 6:
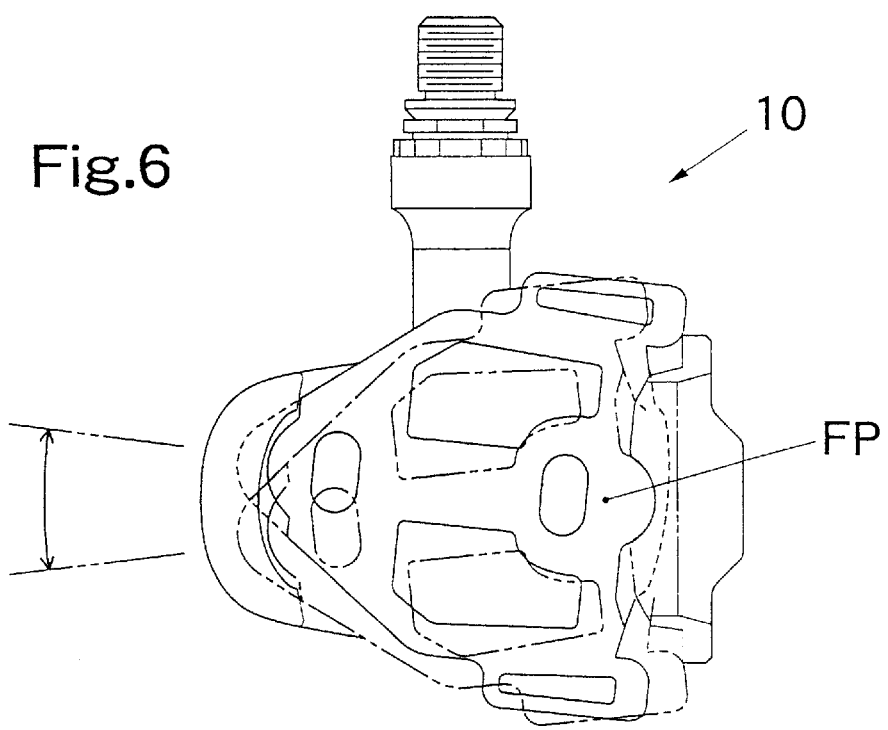
FIG. 6 is a top plan view of the bicycle pedal assembly illustrated in FIGS. 1–3, showing the floating movement of the cleat relative to the pedal.

The cleat 14 is fixedly attached to the bicycle shoe 16 in a conventional manner via fasteners. The cleat 14 is releasably engaged to the pedal body 22 via the clamping members 24 and 26 in a relatively conventional manner. In other words, the cleat 14 is designed to releasably couple the sole of the shoe 16 to the bicycle pedal 12 by the front and rear clamping members 24 and 26. This type of pedal is often called a step-in or clipless pedal. Specifically, the cleat 14 is engaged with the pedal 12 by pressing the cleat 14 into the pedal 12 with a forward and downward motion. This releasably locks the cleat 14 to the pedal 12. The cleat 14 can be released from pedal 12 by twisting the heel of the shoe to the outside of the pedal 12 as discussed below in more detail (shown FIG. 7). However, the shoe 16 is capable of limited rotation or float about a rear float pivot axis FP prior to disengagement (shown in FIG. 6), as also discussed below in more detail.

As shown in FIGS. 10–13, the pedal body 22 has a center tubular portion 30 (with the hollow area), an inner (first) side portion 32 and an outer (second) side portion 34. The center tubular portion 30 receives the pedal shaft 20 for rotation about the center longitudinal axis A, while the side portions 32 and 34 pivotally support the rear clamping member 26. The side portions 32 and 34 are coupled together at the front of the pedal body 22 (in a substantially U-shape) to form the front clamping member 24 as an integral part of the pedal body 22. The parts of the pedal body 22 are preferably made of a lightweight rigid metallic material such as an aluminum alloy. One of the clamping members 24 and 26 is located at each end of pedal body 22. In particular, the pedal body 22 is an A-shaped member with a first (front) closed end 36 and a second (rear) open end 38. The front clamping member 24 is coupled at the first end 36, while the rear clamping member 26 is coupled to the second end 38. The rear clamping member 26 pivotally coupled between the side portions 32 and 34 via the pivot pin 28.

The center tubular portion 30 is preferably integrally formed with the first and second side portions 32 and 34 as a one-piece, unitary member. Moreover, the front clamping member 24 is also preferably integrally formed with the pedal body 22. Of course, it will be apparent to those skilled in the art from this disclosure that other constructions could be utilized if needed and/or desired. For example, the pedal body could be formed of several separate pieces removably secured together by a plurality of screws or other conventional fasteners. Furthermore, it will be apparent to those skilled in the art that the front clamping member 24 could be a separate member that is releasably coupled to a one-piece H-shaped pedal body if needed and/or desired. In any event, the front clamping member 24 is preferably fixedly and non-movably coupled to the pedal body 22.

Figure 10:
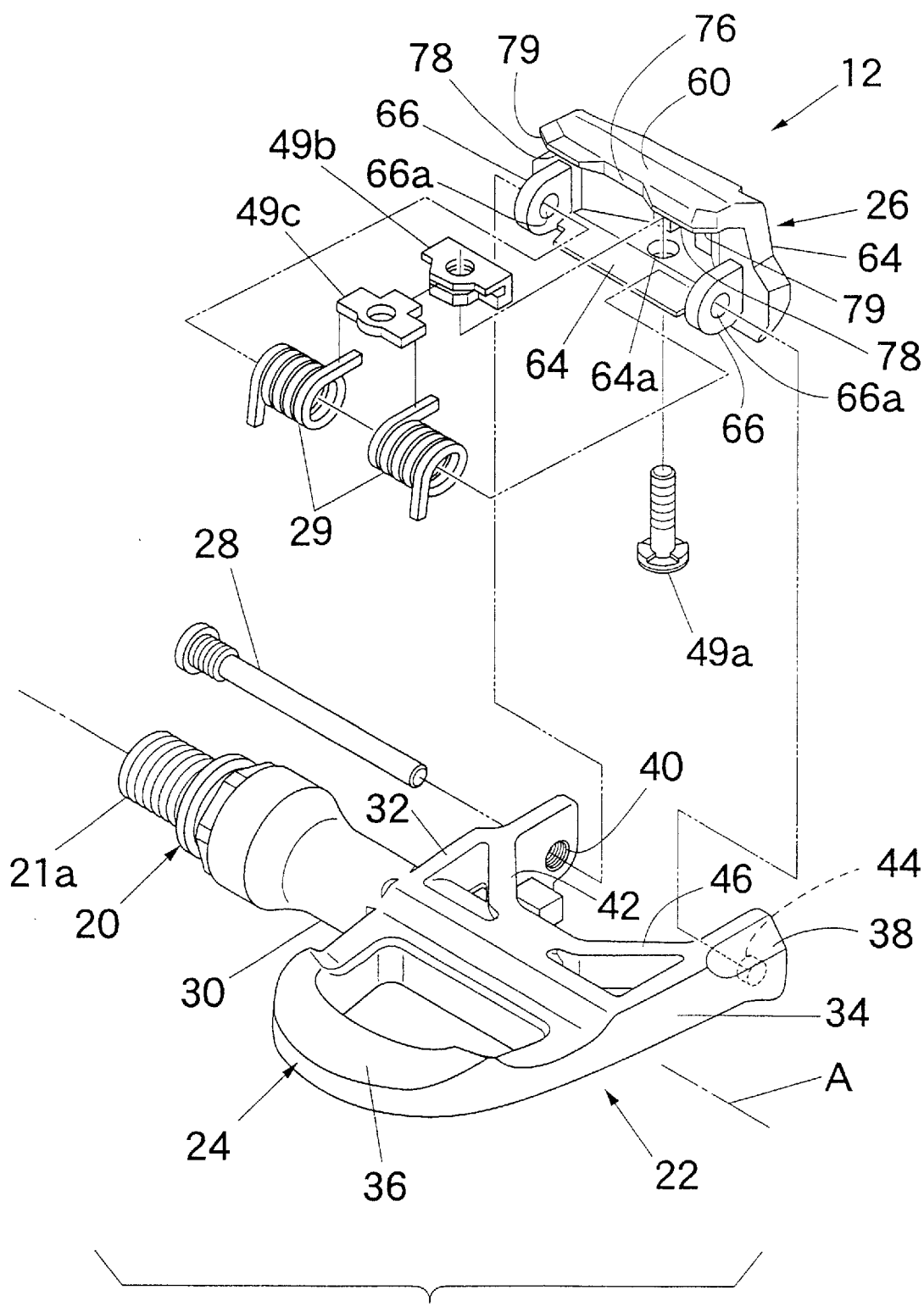
FIG. 10 is an exploded, perspective view of the bicycle pedal illustrated in FIGS. 8–9.

The side portions 32 and 34 extend forward and backward from the center tubular portion 30 such that the clamping members 24 and 26 are located at opposite ends thereof. The first side portion 32 has a threaded through bore 40 (at the second end 38 of pedal body 22) for receiving support pin 28 therein, as seen in FIG. 10. The threaded bore 40 aids in providing an attractive appearance, since the end or head of pin 28 is not visible from the outside of the pedal body 22. The second (outer) side portion 34 is provided with an unthreaded blind bore 44 aligned with threaded bore 40 for receiving the outer end of the pivot pin 28. The bores 40 and 44 are configured to secure the pivot pin 28 therein in an aesthetic and reliable manner. Thus, a smooth outer surface can be formed.

The first side portion 32 also has a reinforcing or support portion 42 extending outwardly therefrom that is connected to the center tubular portion 30. The support portion 42 is inclined relative to the side portion 32 and the center longitudinal axis A. An enlarged central blind bore 43 extends through the center tubular portion 30 and the side portion 32 for rotatably receiving the shaft 20 therein (i.e. to form the hollow area). Additionally, the second side portion also has a reinforcing or support portion 46 extending inwardly therefrom that is connected to the center tubular portion 30. The support portion 46 is inclined relative to the side portion 34 and the center longitudinal axis A.

As mentioned above, the front clamping member 24 is preferably integrally formed with the pedal body 22. Thus, the front clamping member 24 is preferably formed of lightweight rigid metallic material such as aluminum alloy. The front clamping member 24 basically includes a front cleat engagement surface 50 and a front pedal control surface 52, as seen in FIGS. 9 and 11–13. The front cleat engagement surface 50 is a substantially C-shaped flat surface that faces in a downward (first) direction when the pedal 12 is in the normal riding position. The front cleat engagement surface 50 lies in a first plane $P_1$. The front pedal control surface 52 is a transverse surface extending upwardly from the rear edge of the front cleat engagement surface 50.

Figure 4:
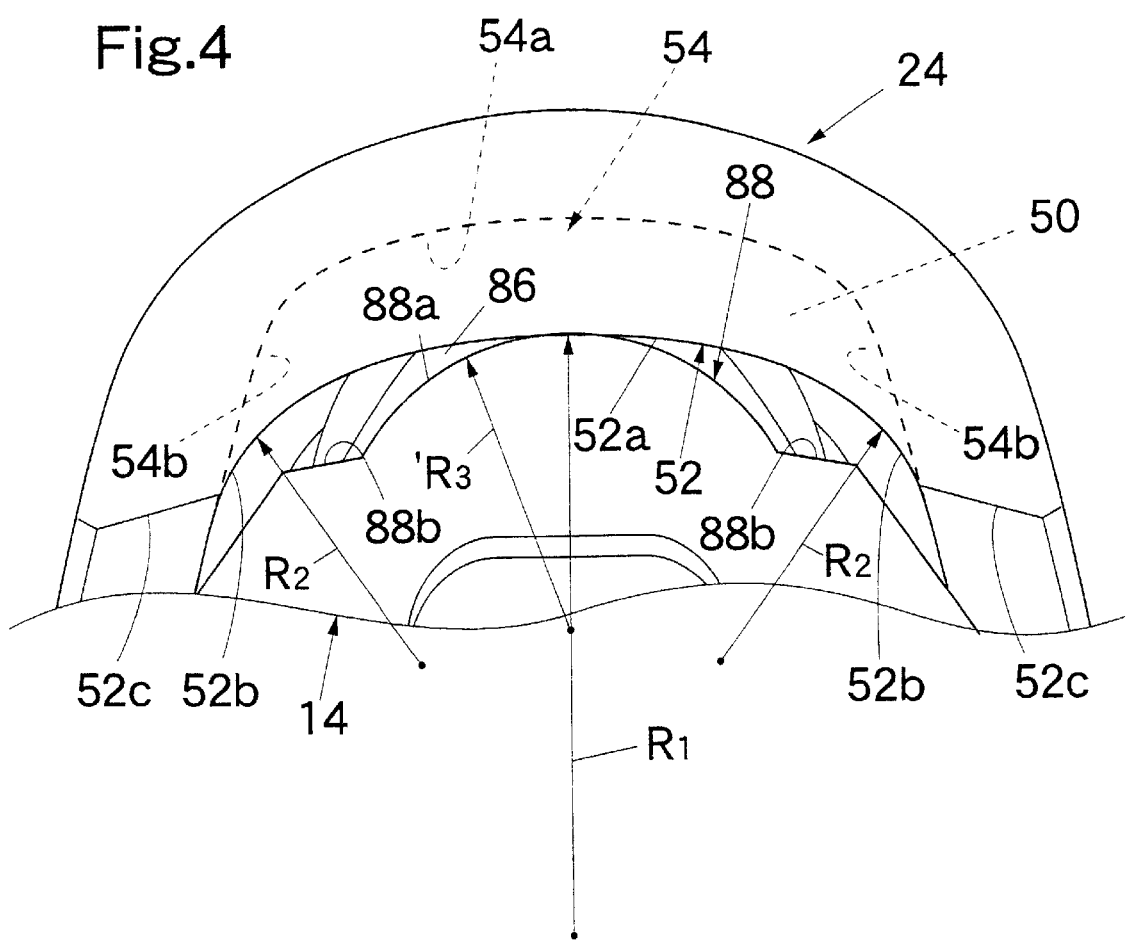
FIG. 4 is an enlarged, top plan view of the front portion of the cleat coupled to the front portion of the pedal of the bicycle pedal assembly illustrated in FIGS. 1–3.
Figure 5:
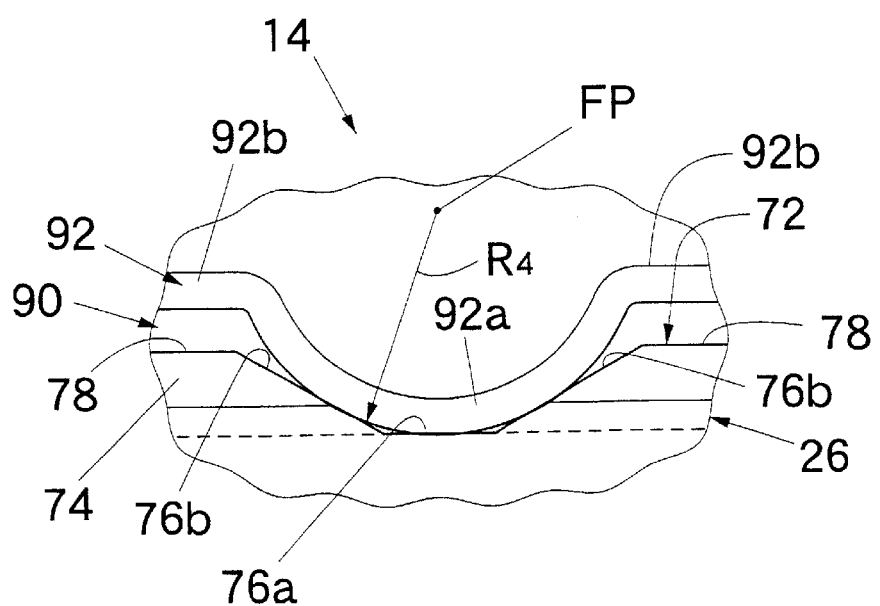
FIG. 5 is an enlarged, top plan view of the rear portion of the cleat coupled to the rear portion of the pedal of the bicycle pedal assembly illustrated in FIGS. 1–3.

More specifically, the front pedal control surface 52 is preferably arranged substantially perpendicular to the front cleat engagement surface 50. The front pedal control surface 52 is formed of a concave curved center section 52a with a radius of curvature $R_1$ and a pair of concave curved end sections 52b, each with a radius of curvature $R_2$ that is smaller than the radius of curvature $R_1$ as shown in FIG. 4. Each of the curved end sections 52b has a flat edge surface 52c extending outwardly therefrom. Preferably, the radius of curvature $R_1$ is about three times the radius of curvature $R_2$. More specifically, the radius of curvature $R_1$ is preferably about 26.6 millimeters, while the radius of curvature $R_2$ is preferably about 9.0 millimeters. Each end section 52b has a center of curvature radially spaced about 17 degrees from a center line of the pedal 12 (as measured about the center of curvature of the center section 52a) as best seen in FIG. 4.

The front clamping member 24 also preferably includes a transverse abutment surface 54 extending downwardly from the front cleat engagement surface 50. The abutment surface 54 is substantially perpendicular to the front cleat engagement surface 50. The abutment surface 54 has a curved center section 54a with a pair of flat end sections 54b extending therefrom to form a smooth transition with the end sections 52b of the front pedal control surface 52. These end sections 54b and/or the end sections 52b form stop surfaces that prevent rotation of the cleat 14 about the rear floating pivot axis FP. In other words, the cleat 14 normally floats or rotates relative to the pedal 12 until portions of the cleat 14 contact portions of the front pedal control surface 52 and/or the abutment surface 54, as discussed in more detail below.

Referring to FIGS. 10 and 14–19, the rear clamping member 26 has a roughly U-shaped configuration, with its two ends being pivotally supported by the support pin 28 that passes between the side portions 32 and 34 of the pedal body 22. The rear clamping member 26 basically includes a rear clamping portion 60, a mounting portion 62 and a base portion 64. The mounting portion 62 has a pair of mounting flanges 66 extend therefrom to mount the rear clamping member 26 on the support pin 28. Specifically, each mounting flange 66 has a through bore 66a formed therein for receiving the support pin 28. The base portion 64 has a centrally located stepped bore 64a formed therein for receiving part of a tension adjustment mechanism. Specifically, the stepped bore 64a has non-smooth indexing surface configured to mate with a surface of the tension adjustment mechanism 48, as discussed below in more detail. The mounting portion 62 is arranged between the rear clamping portion 60 and the base portion 64.

The rear clamping portion 60 of the rear clamping member 26 basically includes a rear cleat engagement surface 70 and a rear pedal control surface 72. The rear cleat engagement surface 70 is a flat surface that faces in the same direction (i.e. the first downward direction) as the front cleat engagement surface 50. The rear cleat engagement surface 70 lies in a second plane $P_2$ that is offset from the first plane $P_1$. More specifically, the second plane $P_2$ is preferably located above the first plane $P_1$ when the pedal 12 is in the normal riding position. Preferably, the front and rear cleat engagement surfaces 50 and 70 are parallel to each other. The rear pedal control surface 72 is a transverse surface extending upwardly from the rear cleat engagement surface 70. The rear pedal control surface 72 is preferably substantially perpendicular to the rear cleat engagement surface 70. The rear clamping portion 60 also preferably has an inclined guide surface 74 extending upwardly away from the transverse rear pedal control surface 72 to aid in the attachment of the cleat 14 to the pedal 12.

The rear pedal control surface 72 basically includes a rear pedal pivot surface 76, a pair of straight side surfaces 78 and a pair of outer inclined sections 79. The rear pedal pivot surface 76 is preferably formed as a cutout in the rear clamping member 26. The rear pedal pivot surface 76 includes a flat end section 76a and a pair of opposing flat sections 76b connected together by the end section 76a. The sections of the pivot surface 76 are angled relative to each other to form a segmented (or discontinuous) non-curved or non-smooth surface. The rear pedal pivot surface 76 divides the rear cleat engagement surface 70 into two sections. The sections of the rear pedal pivot surface 76 are configured to form an effective curvature that cooperates with the cleat 14 to form the rear floating pivot axis FP. More specifically, in the illustrated embodiment, the rear pedal pivot surface 76 has an effective curvature of about 7.0 millimeters (i.e. a circle tangent to end section 76a and opposing sections 76b has a radius of about 7.0 millimeters). The rear pedal pivot surface 76 cooperates with the cleat 14 such that the cleat 14 floats about the rear floating pivot axis FP.

Each of the side surfaces 78 extends from one of the opposing surfaces 76b of the rear pedal pivot surface 76. The outer inclined sections 79 extend rearwardly from the side surfaces 78 and aid in the disengagement of the cleat 14 from the pedal 12. More specifically, when the cleat 14 floats or rotates a predetermined amount, one of the outer inclined sections 79 acts as an inclined plane to rotate the rear clamping member 26 against the biasing force of the springs 29 to release the cleat 14 from the pedal 12. One of the straight surfaces 78 then acts as slide surface such that the cleat 14 can be completely released from the pedal 12.

The torsion springs 29 have their mounting or coiled portions mounted on support pin 28, with one end of each spring engaging a part of pedal body 22 and the other end of each spring engaging a tension adjustment mechanism 48 (indirectly engaging the rear clamping member 26). The springs 29 normally urge the clamping member 26 to rotate about the pivot pin 28 from a cleat releasing position to a cleat engaging or clamping position. In other words, the springs 29 normally maintain the clamping member 26 in cleat engaging position. The retaining forces of the springs 29 on the clamping member 26 is mainly controlled by changing the springs 29 with either weaker or stronger springs. Of course, the shape and the construction of the clamping member 26 can be modified to change the cleat retaining force if needed and/or desired. Thus, clamping member 26 and/or springs 29 can be easily exchanged to control the cleat retaining force of the pedal 12 or to replace a damaged part.

Figure 8:
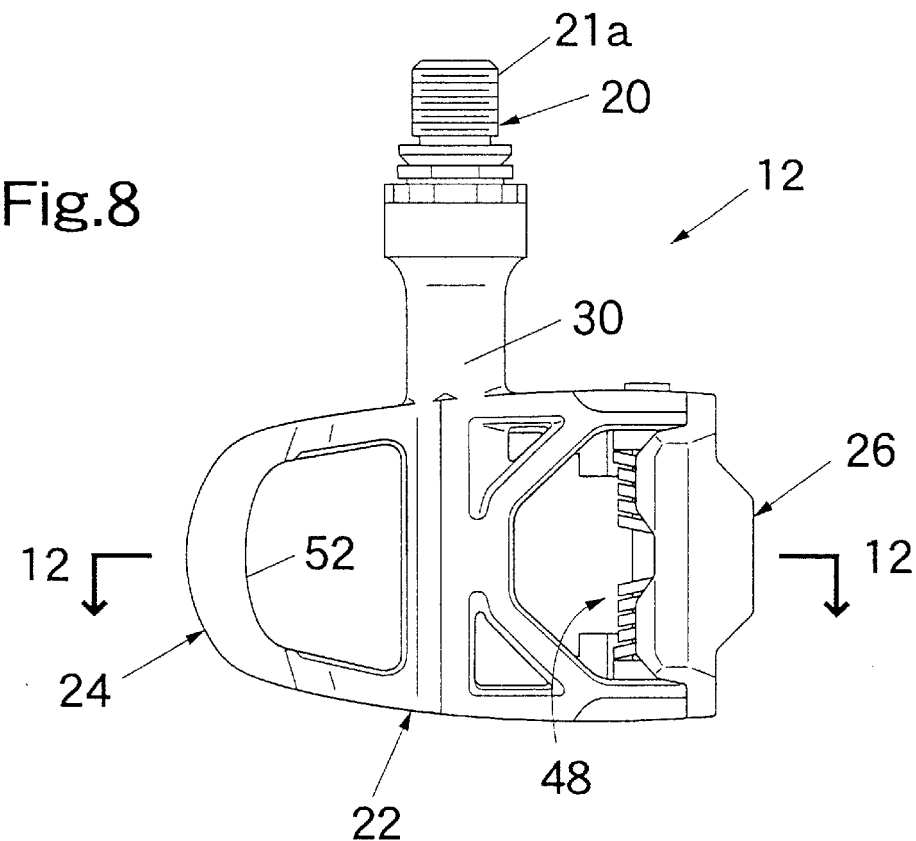
FIG. 8 is a top plan view of the bicycle pedal of the bicycle pedal assembly illustrated in FIGS. 1–3, 6 and 7.
Figure 9:
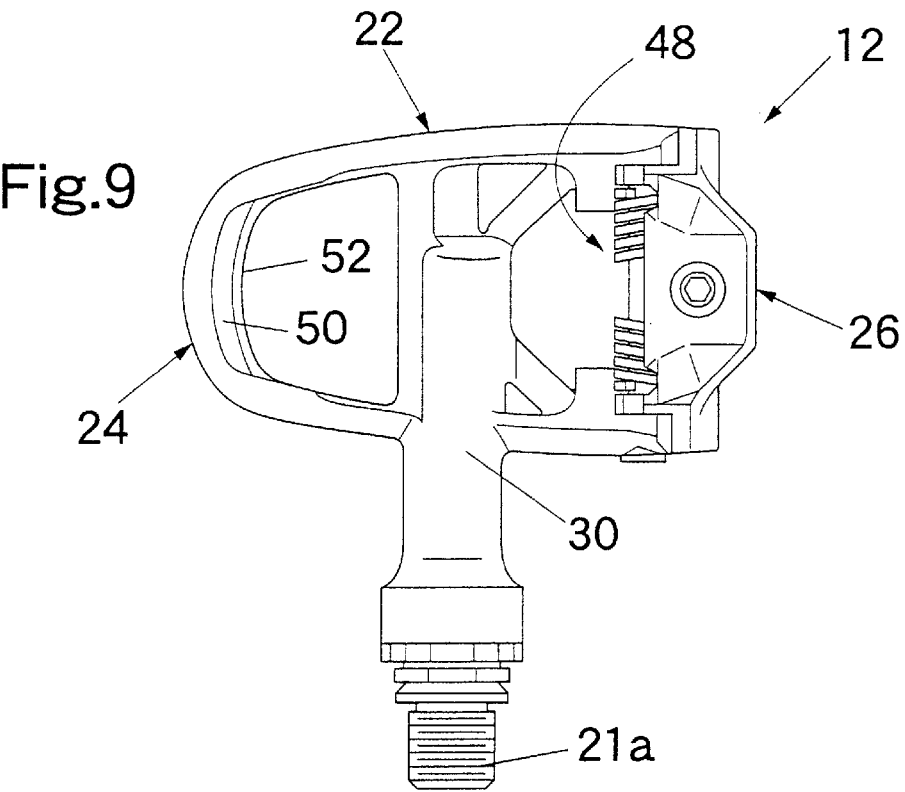
FIG. 9 is a bottom plan view of the bicycle pedal illustrated in FIG. 8.

As best seen in FIGS. 8–10, the tension adjustment mechanism 48 is mounted between the rear clamping member 26 and the springs 29 to adjust the biasing force of the springs 29 applied to the rear clamping member 26. The adjustment mechanism 48 basically includes an adjustment bolt 49a, a support member 49b and an adjustment plate 49c. The adjustment bolt 49a is threaded into a threaded hole formed in the adjustment plate 49c. The head of the adjustment bolt 49a has a non smooth indexing surface designed to mate with a surface of the rear clamping member 26 (i.e. the non-smooth indexing surface of the stepped bore 64a). Thus, the adjustment bolt does not become loose due to vibrations and/or wear. The adjustment plate 49c is a T-shaped plate. The support member 49b has a groove with a centrally located slot to receive the adjustment plate 49c and ends of the springs 28. The support member 49b contacts the rear clamping member 26 to apply the biasing force of the springs 28 to the rear clamping member. The associated springs 28 are now adjustably placed under tension. This arrangement allows for easy assembly of the bicycle pedal 12. The tension adjustment mechanism is relatively conventional, and thus, will not be discussed and/or illustrated in detail herein.

A cleat receiving area is formed on one side of the pedal body 22 for receiving and supporting the cleat 14 thereon. More specifically, the cleat receiving area is defined by the space located between the front and rear clamping members 24 and 26 in which the cleat 14 is received. The front and rear clamping members 24 and 26 engage the cleat 14 to releasably couple the sole of the shoe 16 to the bicycle pedal 12. Specifically, the cleat 14 is engaged with the pedal 12 by pressing the cleat 14 into pedal 12 with a forward and downward motion. This releasably locks the cleat 14 to the pedal 12. The cleat 14 can be released from the pedal 12 by twisting the heel of the shoe to the outside of the pedal 12 as discussed below in more detail.

Referring to FIGS. 1 and 20–24, bicycle shoe cleat 14 basically includes a center connecting portion 80, a first or front attachment portion 82 extending from one end of center connecting portion 80 and a second or rear attachment portion 84 extending from the other end of the center connecting portion 80. The center connecting portion 80 has an upper sole side facing in a first direction for engaging the sole of the shoe 16 and a lower pedal side facing in a second direction which is substantially opposite to the first direction. Preferably, the center connecting portion 80 and the attachment portions 82 and 84 are integrally formed together as a one-piece, unitary member, which is constructed from a suitable rigid material. The interconnection of the cleat 14 to the sole is relatively well known in the art, and thus, this interconnection will not be discussed or illustrated in detail herein.

The front attachment portion 82 of the cleat 14 basically includes a front coupling surface 86 and a front cleat control surface 88. The front coupling surface 86 is selectively engageable with the front engagement surface 50 of the front clamping member 24. The front cleat control surface 88 cooperates with the front pedal control surface 52 to control movement of the cleat 14 relative to the pedal 12. Specifically, the front cleat control surface 88 is a transverse surface extending upwardly from the front coupling surface 86. Preferably the front cleat control surface 88 is substantially perpendicular to the front coupling surface 86 and includes a central convex curved surface 88a and a pair of end surfaces 88b as seen in FIG. 4.

The central convex surface has a radius of curvature $R_3$ smaller than the radius of curvature $R_1$ of the concave surface 52a of the front pedal control surface 52. Moreover, the radius of curvature $R_3$ is preferably substantially equal to or slightly smaller than the radius of curvature $R_2$ of the end sections 52b of the front pedal control surface 52. Specifically, the radius of curvature $R_3$ is preferably about 9.0 millimeters. The end surfaces 88b correspond generally in shape to the edge surfaces 52c of the front pedal control surface 52. Thus, the central convex curved surface 88a and one of the pair of end surfaces 88b act as a stop surface.

The rear attachment portion 84 of the cleat 14 basically includes a rear coupling surface 90 and a rear cleat control surface 92. The rear coupling surface 90 is selectively engageable with the rear engagement surface 70 of the rear clamping member 26. The rear cleat control surface 92 cooperates with the rear pedal control surface 72 to control movement of the cleat 14 relative to the pedal 12. Specifically, the rear cleat control surface 92 is a transverse surface extending upwardly from the rear coupling surface 90. Preferably the rear cleat control surface 92 is an inclined surface forming an angle of about 100 degrees with the rear coupling surface 90 and includes a central convex curved surface 92*a*, a pair of straight side surfaces 92*b* and a pair of inclined edge surfaces 92*c*.

Figure 7:
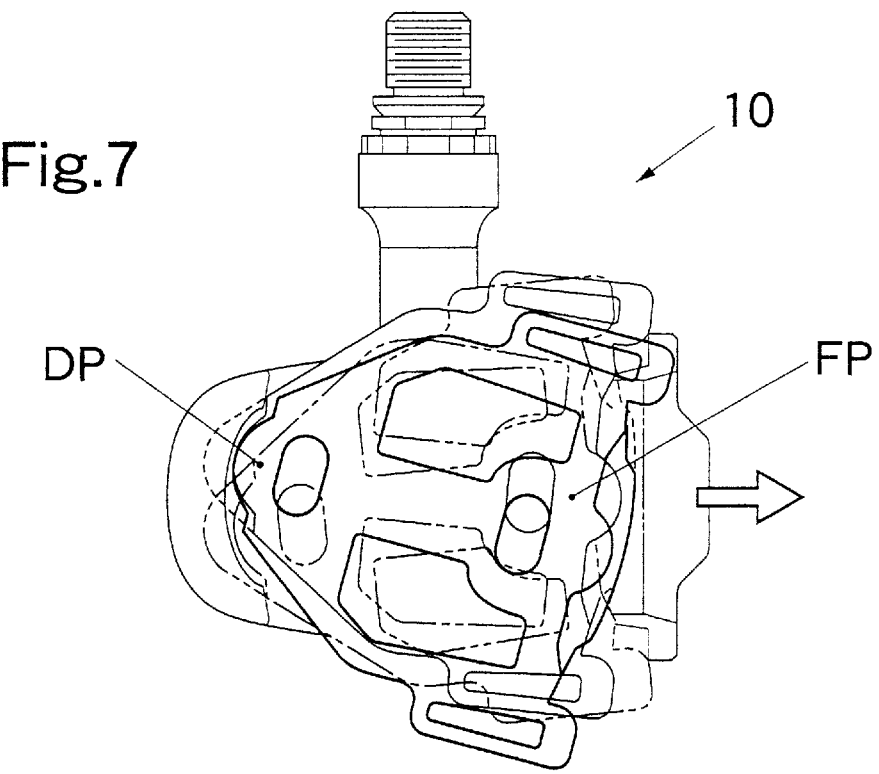
FIG. 7 is a top plan view of the bicycle pedal assembly illustrated in FIGS. 1–3 and 6, showing the cleat being disengaged from the pedal.

The rear attachment portion 84 includes a projection 94 extending rearwardly therefrom to divide the rear coupling surface 90 into a pair of sections. The central convex curved surface 92*a* is formed on the projection 94. The central convex curved surface 92*a* has a radius of curvature $R_4$ approximately equal to the effective curvature of the rear pedal pivot surface 76 (i.e. about 7.0 millimeters) such that the cleat 14 normally rotates or floats about the rear floating pivot axis FP. Once the front attachment portion 82 stops rotating or floating due to the configurations of the front pedal and cleat control surfaces 52 and 88, the cleat 14 will rotate around a front disengagement pivot axis DP as seen in FIG. 7. The edge surfaces 92*c* then cooperate with the edge surfaces 72*c* to disengage the cleat 14 from the pedal 12.

Referring again to FIG. 3, a pedaling force center PFC is aligned with the rear float pivot axis FP when the cleat 14 is in a straight (non-floated) orientation. The PFC is the center point of application of the pedaling force of the rider and lies on a forward pedaling force vector F. However, the cleat 14 is preferably capable of floating (rotating) approximately three degrees (i.e. a total of six degrees) in either direction from the straight (non-floated) orientation about the rear float pivot axis FP. Even when the cleat 14 floats or rotates about the rear float pivot axis FP relative to the pedal 12, the pedaling force center PFC remains substantially aligned (or only slightly offset) from the rear float pivot axis FP such that the cleat 14 does not accidentally become disengaged from the pedal 12. In other words, the forward pedaling force vector F is applied substantially along both the rear float pivot axis FP and the pedaling force center PFC. Thus, effective pedaling power is achieved without disengagement.

SECOND EMBODIMENT

Referring now to FIGS. 25–42, a bicycle pedal assembly 110 is illustrated in accordance with a second embodiment of the present invention. The bicycle pedal assembly 110 of this second embodiment operates in a manner substantially identical to the bicycle pedal assembly 10 of the first embodiment. However, the structure of the bicycle pedal assembly 110 of this second embodiment has been modified.

Specifically, the bicycle pedal assembly 110 of this second embodiment includes a modified bicycle pedal 112 and a modified bicycle shoe cleat 114. More specifically, the pedal 112 and the cleat 114 are configured to have a rear floating pivot axis FP' located rearwardly of the cleat 114 when the cleat 114 is coupled to the pedal 112. The main difference in this second embodiment compared to the first embodiment is that the pedal 112 has a modified rear clamping member and the cleat 114 has a modified rear attachment portion. In view of the similarities between this second embodiment and the first embodiment, the following description will focus mainly on the differences. However, it will be apparent to those skilled in the art from this disclosure that most of the descriptions of the first embodiment also apply to this second embodiment.

Figure 25:
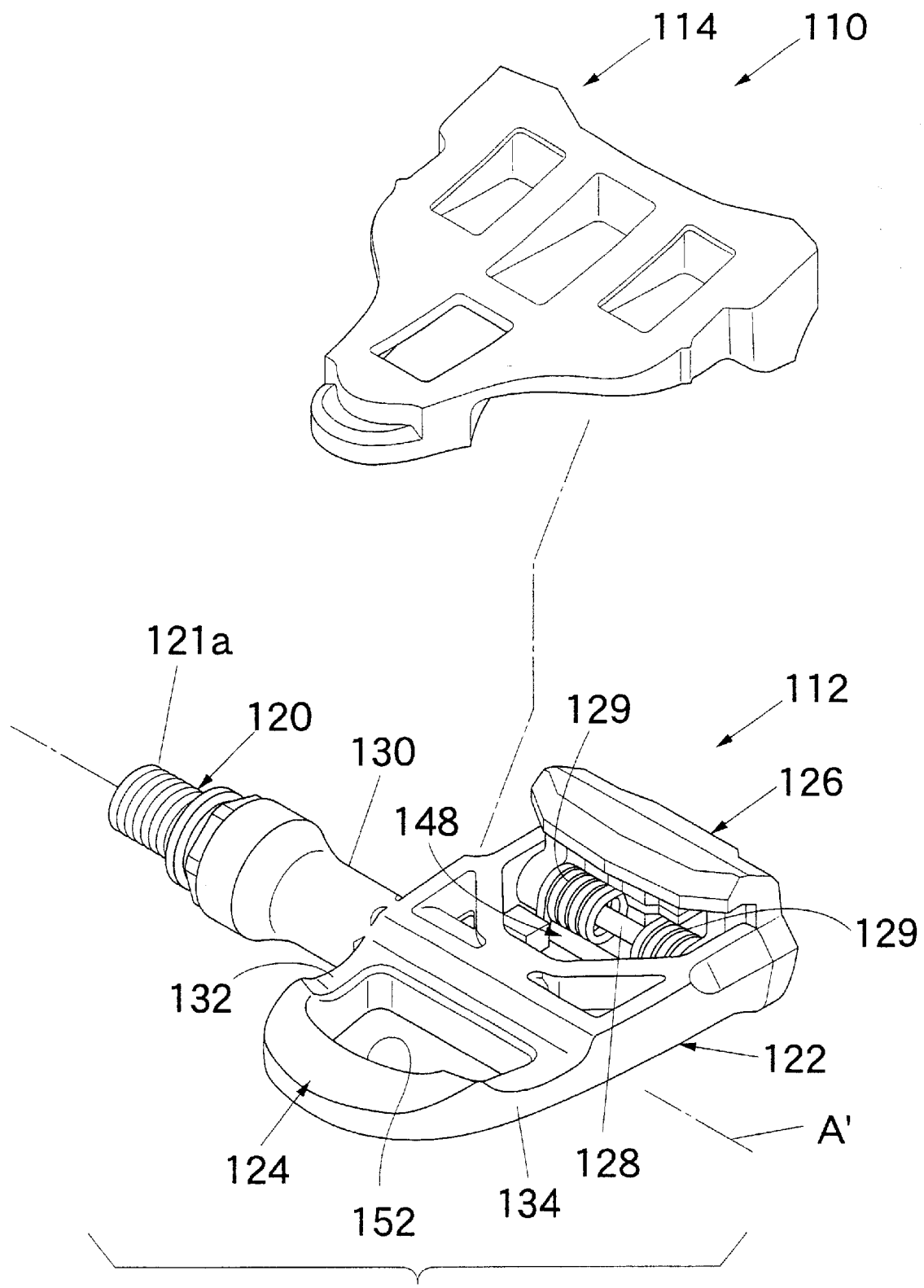
FIG. 25 is an exploded perspective view of a bicycle pedal assembly in accordance with an alternate embodiment of the present invention.
Figure 26:
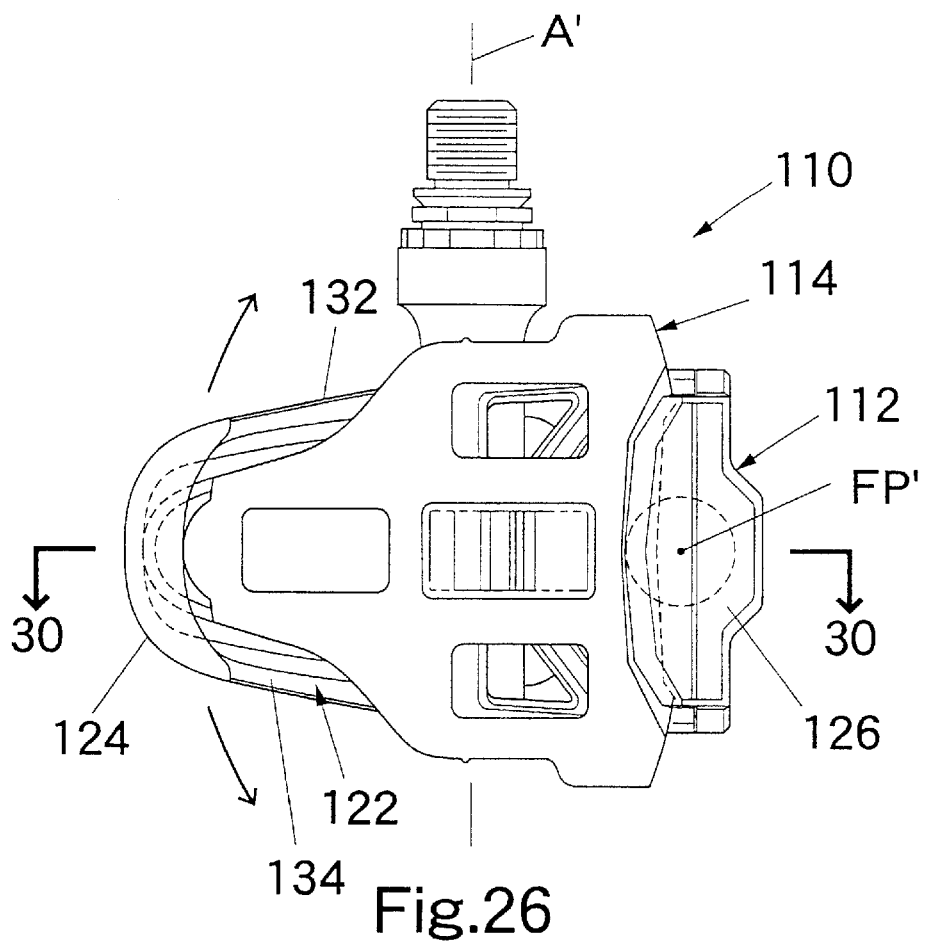
FIG. 26 is an enlarged, top plan view of the bicycle pedal assembly illustrated in FIG. 25, with the cleat coupled to the pedal and removed from the shoe.
Figure 27:
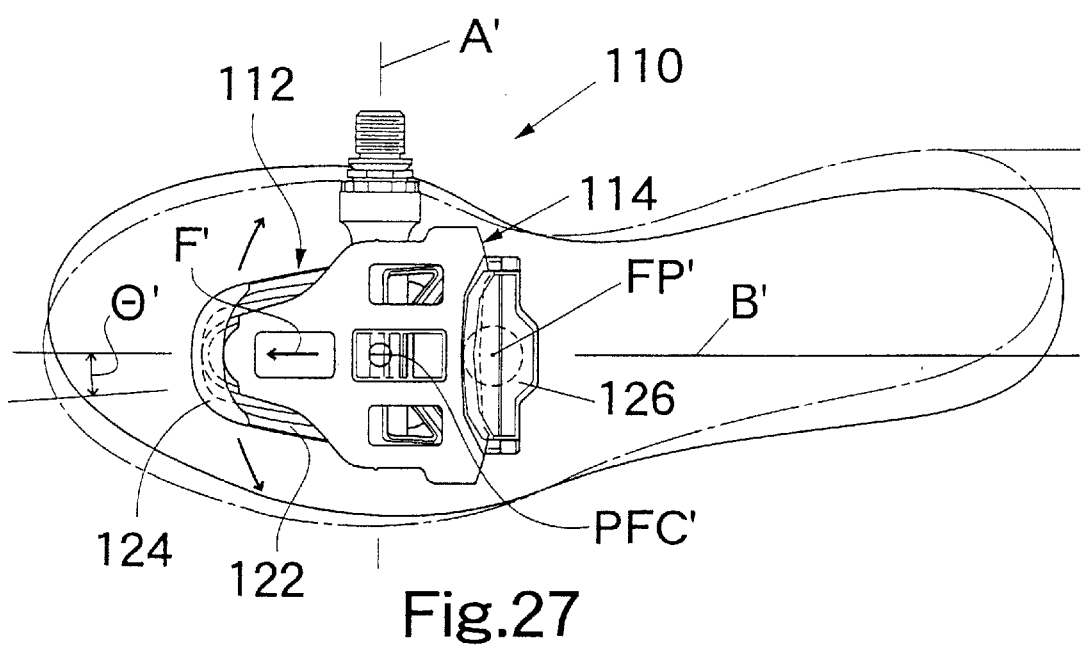
FIG. 27 is a top plan view of the bicycle pedal assembly illustrated in FIGS. 25 and 26, with the cleat coupled to the pedal and the float of the shoe shown in broken lines.
Figure 30:
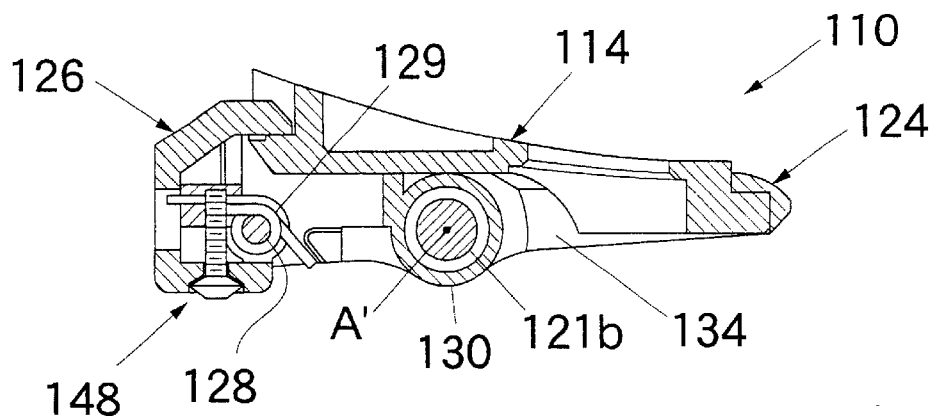
FIG. 30 is a cross-sectional view of the bicycle pedal assembly illustrated in FIGS. 25–29, as seen along section line 30—30 of FIG. 26.
Figure 31:
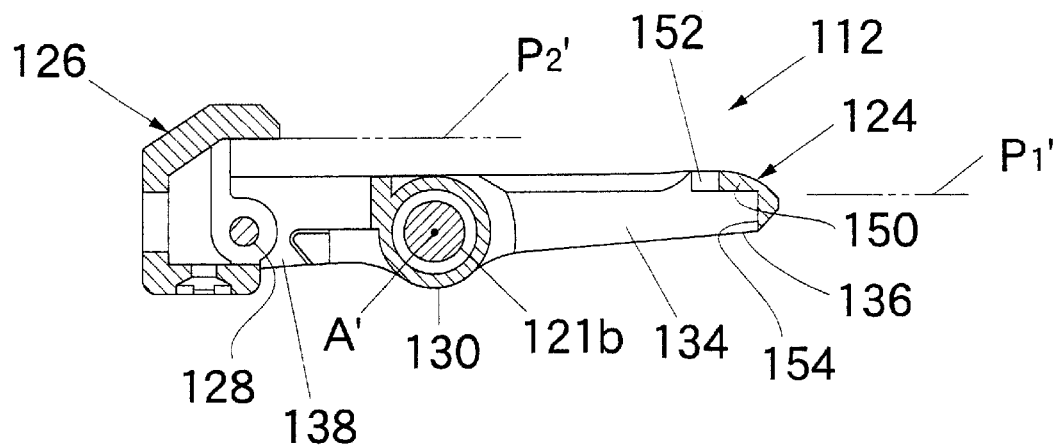
FIG. 31 is a cross-sectional view of the bicycle pedal illustrated in FIGS. 25–30, as seen along section line 30—30 of FIG. 26, with the biasing mechanism removed for the purpose of illustration.
Figure 32:
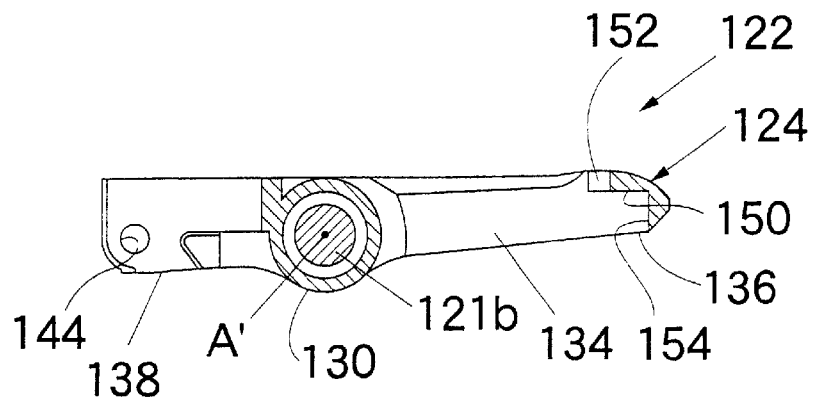
FIG. 32 is a cross-sectional view of the bicycle pedal illustrated in FIGS. 25–31, as seen along section line 30—30 of FIG. 26, with the rear clamping mechanism removed for the purpose of illustration.
Figure 33:
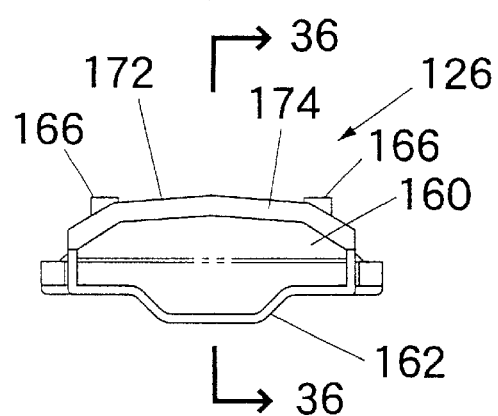
FIG. 33 is a top, plan view of the rear clamping member of the bicycle pedal illustrated in FIGS. 25–27 and 29–31.
Figure 34:
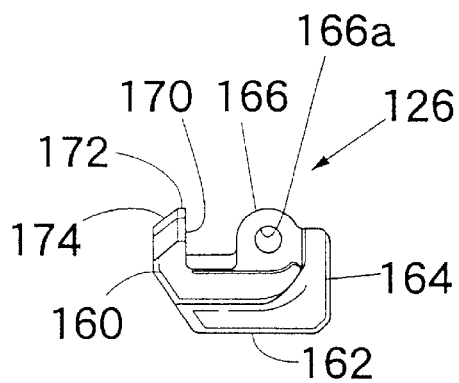
FIG. 34 is a side elevational view of the rear clamping member illustrated in FIG. 33.
Figure 35:
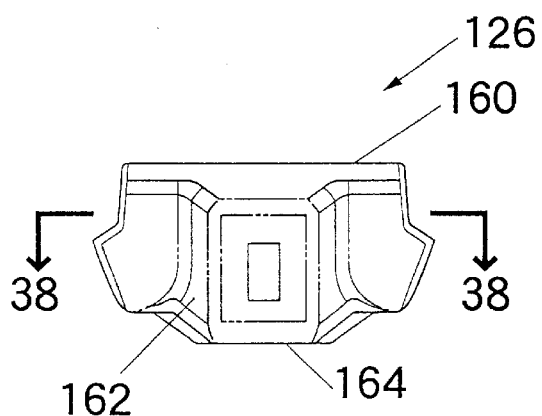
FIG. 35 is a rear elevational view of the rear clamping member illustrated in FIGS. 33 and 34.
Figure 36:
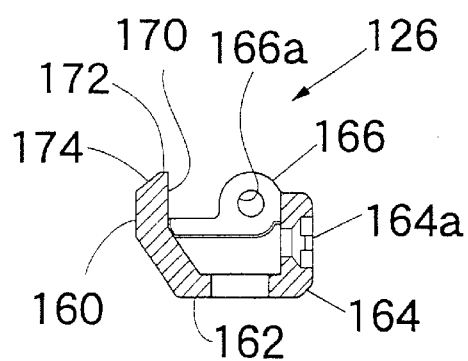
FIG. 36 is a cross-sectional view of the rear clamping member illustrated in FIGS. 33–35, as seen along section line 36—36 of FIG. 33.
Figure 37:
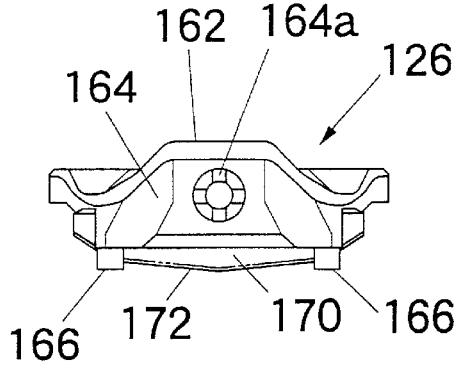
FIG. 37 is a bottom plan view of the rear clamping member illustrated in FIGS. 33–36.
Figure 38:
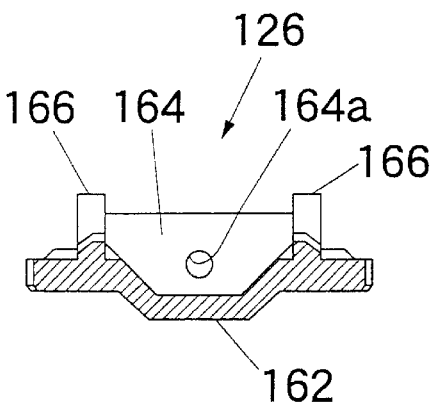
FIG. 38 is a cross-sectional view of the rear clamping member illustrated in FIGS. 33–37, as seen along section line 38—38 of FIG. 35.

As seen in FIGS. 25–27, the bicycle pedal 112 basically includes a pedal shaft or spindle 120, a pedal body 122, a front (first) clamping member 124 and a rear (second) clamping member 126. The front and rear clamping members 124 and 126 are preferably fixedly coupled to the pedal body 122. The shaft 120 is adapted to be coupled to a crank arm in a manner identical to the first embodiment, while the pedal body 122 is rotatably coupled to the shaft 120 for supporting a cyclist's foot in a manner identical to the first embodiment. The pedal shaft 120 has a first end 121*a* that is fastened to the crank arm and a second end 121*b* (shown in FIGS. 30–32) with the pedal body 122 rotatably coupled thereto. A center longitudinal axis A' extends between the first and second ends 121*a* and 121*b* of the pedal shaft 120. The pedal body 122 is freely rotatable about the center longitudinal axis A'. A cleat receiving area is formed on one side of the pedal body 122 for receiving and supporting the cleat 114 thereon. More specifically, the cleat receiving area is defined between the front and rear clamping members 124 and 126.

Referring to FIGS. 25–32, the front clamping member 124 is fixedly coupled to the pedal body 122 while the rear clamping member 126 is pivotally coupled to the pedal body 122. More specifically, the front clamping member 124 is preferably a non-movable member that is integrally formed with the pedal body 122 while the rear clamping member 126 is preferably a separate member mounted on a pivot pin or support pin 128. The pivot pin 128 is coupled to the pedal body 122. Two springs 129 are preferably coupled between the pedal body 122 and the rear clamping member 126. While two springs 129 are preferably mounted on the pivot pin 128, it will be apparent to those skilled in the art from this disclosure that fewer or more springs can be used. Moreover, it will be apparent to those skilled in the art the other types of urging member(s)/resilient member(s) could be utilized to carry out the present invention. Accordingly, the term "biasing member" as used herein refers to one or more members that applies an urging force between two elements.

The pedal body 122 is substantially identical to pedal body 22 of the first embodiment and basically includes a center tubular portion 130, an inner (first) side portion 132 and an outer (second) side portion 134. The center tubular portion 130 receives the pedal shaft 120 for rotation about the center longitudinal axis A', while the side portions 132 and 134 pivotally support the rear clamping member 126. The side portions 132 and 134 are coupled together at the front of the pedal body 122 (in a substantially U-shape) to form the front clamping member 124 as an integral part of the pedal body 122. In other words, the pedal body 122 is an A-shaped member with a first (front) closed end 136 and a second (rear) open end 138. The front clamping member 124 is coupled at the first end 136 while the rear clamping member 126 is coupled to the second end 138. The rear clamping member 124 pivotally coupled between the side portions 132 and 134 via the pivot pin 128. The first side portion 132 has a threaded through bore (not shown) at the second end 138 of pedal body 122 for receiving support pin 128 therein. The second (outer) side portion 134 is provided with an unthreaded blind bore 144 aligned with threaded bore for receiving the outer end of the pivot pin 128 in a manner identical to the first embodiment. The bore 140 and the threaded bore (not shown) are configured to secure the pivot pin 128 therein in an aesthetic and reliable manner.

Referring still to FIGS. 25–32, the front clamping member 124 basically includes a front cleat engagement surface 150 and a front pedal control surface 152. The front cleat engagement surface 150 is a substantially C-shaped flat surface that faces in a first (downward) direction when the pedal 112 is in the normal riding position. The front cleat engagement surface 150 lies in a first plane $P_1'$. The front pedal control surface 152 is a transverse surface extending upwardly from the front cleat engagement surface 150. More specifically, the front pedal control surface 152 is preferably substantially perpendicular to the front cleat engagement surface 150 and has a concave curved center section 152a with a radius of curvature $R_1'$ and a pair of end sections 152b extending outwardly therefrom. Radius of curvature $R_1'$ is preferably about 26.6 millimeters as best seen in FIG. 28.

The front clamping member 124 also preferably includes a transverse abutment surface 154 extending downwardly from the front cleat engagement surface 150. The abutment surface 154 is substantially perpendicular to the front cleat engagement surface 150 and has a curved center section 154a with a pair of flat end sections 154b extending therefrom to form stop surfaces that prevent rotation of the cleat 114 about the rear floating pivot axis FP'.

As best seen in FIGS. 28, 29 and 33–38 the rear clamping member 126 has a roughly U-shaped configuration, with its two ends being pivotally supported by the support pin 128 that passes between the side portions 132 and 134 of the pedal body 122. The rear clamping member 126 basically includes a rear clamping portion 160, a mounting portion 162 and a base portion 164. A pair of mounting flanges 166 extend from the mounting portion 162 and the base portion 164 to mount the rear clamping member on the support pin 128. Specifically, each mounting flange 166 has a through bore 166a formed therein for receiving the support pin 128. The base portion 164 has a centrally located stepped bore 164a formed therein for receiving part of a tension adjustment mechanism 148. The tension adjustment mechanism 148 is substantially identical to the tension adjustment mechanism 48 of the first embodiment. Thus, the tension adjustment mechanism 148 will not be discussed and/or illustrated in detail herein. The mounting portion 162 is arranged between the rear clamping portion 160 and the base portion 164.

The rear clamping portion 160 of the rear clamping member 126 basically includes a rear cleat engagement surface 170 and a rear pedal control surface 172. The rear cleat engagement surface 170 is a flat surface that faces in the same direction (i.e. the first downward direction) as the front cleat engagement surface 150. The rear cleat engagement surface 170 lies in a second plane $P_2'$ that is offset from the first plane $P_1'$. More specifically, the second plane $P_2'$ is preferably located above the first plane $P_1'$ when the pedal 12 is in the normal riding position. Preferably, the front and rear cleat engagement surfaces 150 and 170 are parallel to each other. The rear pedal control surface 172 is a transverse surface extending upwardly from the rear cleat engagement surface 170. The rear pedal control surface 172 is preferably substantially perpendicular to the rear cleat engagement surface 170. The rear clamping portion 160 also preferably has an inclined guide surface 174 extending upwardly away from the transverse rear pedal control surface 172 to aid in the attachment of the cleat 114 to the pedal 112.

The rear pedal control surface 172 basically includes a rear pedal pivot surface 176 and a pair of side surfaces 178. The rear pedal pivot surface 176 is preferably a continuous convex curved surface, which connects the side surfaces 178. The side surfaces 178 are angled relative to each other to provide space for the float of the cleat 114. The rear pedal pivot surface 176 forms an effective curvature that cooperates with the cleat 114 to form the rear floating pivot axis FP'. More specifically, the rear pedal pivot surface 176 has an effective curvature of about 8.0 millimeters, which cooperates with a surface of the cleat 114 such that the cleat 114 floats about the rear floating pivot axis FP' as best seen in FIG. 29.

Each of the side surfaces 178 has an outer inclined section 179 extending rearwardly therefrom. The outer inclined sections 179 aid in the disengagement of the cleat 114 from the pedal 112. More specifically, when the cleat 114 floats or rotates a predetermined amount, one of the outer inclined sections 179 acts as an inclined plane to rotate the rear clamping member 126 against the biasing force of the springs 129 to release the cleat 114 from the pedal 112. One of the side surfaces 178 then acts as slide surface such that the cleat 114 can be completely released from the pedal 112.

The torsion springs 129 have their mounting or coiled portions mounted on support pin 128, with one end of each spring engaging a part of pedal body 122 and the other end of each spring engaging the tension adjustment mechanism 148 (indirectly engaging the rear clamping member 126). The springs 129 normally urge the clamping member 126 to rotate about the pivot pin 128 from a cleat releasing position to a cleat engaging or clamping position. In other words, the springs 129 normally maintain the clamping member 126 in cleat engaging position.

Referring to FIGS. 28, 29 and 39–42, the bicycle shoe cleat 114 basically includes a center connecting portion 180, a first or front attachment portion 182 extending from one end of center connecting portion 180 and a second or rear attachment portion 184 extending from the other end of the center connecting portion 180. Preferably, the center connecting portion 180 and the attachment portions 182 and 184 are integrally formed together as a one-piece, unitary member, which is constructed from a suitable rigid material. The center connecting portion 180 has a plurality of holes formed therein for receiving fasteners (not shown) in a manner substantially identical to the first embodiment. Specifically, the cleat 114 is designed for use with three fasteners. The interconnection of the cleat 114 to the shoe sole is well known in the art, and thus, this interconnection will not be discussed or illustrated in detail herein.

The front attachment portion 182 of the cleat 114 basically includes a front coupling surface 186 and a front cleat control surface 188. The front coupling surface 186 is selectively engageable with the front engagement surface 150 of the front clamping member 124. The front cleat control surface 188 cooperates with the front pedal control surface 152 to control movement of the cleat 114 relative to the pedal 112. Specifically, the front cleat control surface 188 is a transverse surface extending upwardly from the front coupling surface 186. Preferably the front cleat control surface 188 is substantially perpendicular to the front coupling surface 186 and includes a central convex curved surface 188a and a pair of end surfaces 188b.

The central convex surface 188a has a radius of curvature $R_3'$ smaller than the radius of curvature $R_1'$ of the concave surface 152a of the front pedal control surface 152. The end surfaces 188b correspond generally in shape to the end sections 152b of the front pedal control surface 152. Thus, the two opposed flat end sections 154b of the abutment surface 154 act as stop surfaces when a portion of the cleat 114 contacts these surfaces.

The rear attachment portion 184 of the cleat 114 basically includes a rear coupling surface 190 and a rear cleat control surface 192. The rear coupling surface 190 is selectively engageable with the rear engagement surface 170 of the rear clamping member 126. The rear cleat control surface 192 cooperates with the rear pedal control surface 172 to control movement of the cleat 114 relative to the pedal 112. Specifically, the rear cleat control surface 192 is a transverse surface extending upwardly from the rear coupling surface 190. Preferably, the rear cleat control surface 192 forms an angle of about ninety degrees with the rear coupling surface 190 and includes a central concave curved surface 192a, a pair of straight side surfaces 192b and a pair of inclined edge surfaces 192c. The shape of the rear cleat control surface 192 corresponds generally in shape to the rear pedal control surface 172. However, the straight side surfaces 192b and the inclined edge surfaces 192c are spaced from the side surfaces 178 and the outer inclined sections 179 to allow the cleat 114 to float about the pivot axis FP'.

The central concave curved surface 192a has a radius of curvature $R_4'$ approximately equal to (or slightly larger than) the curvature of the rear pedal pivot surface 176 (i.e. about 8.0 millimeters) such that the cleat 114 normally rotates or floats about the rear floating pivot axis FP'. Once the front attachment portion 182 stops rotating or floating due to the configuration of the abutment surface 154, the cleat 114 will rotate around a front disengagement pivot axis (not shown) in a manner substantially identical to the first embodiment. The edge surfaces 192c then cooperate with the edge surfaces 172c to disengage the cleat 114 from the pedal 112.

Referring again to FIG. 27, a pedaling force center PFC' is aligned with the rear float pivot axis FP' when the cleat 114 is in a straight (non-floated) orientation. The PFC' is the center point of application of the pedaling force of the rider and lies on a forward pedaling force vector F'. However, the cleat 114 is prefarably capable of floating (rotating) approximately three degrees (i.e. a total of six degrees) in either direction from the straight (non-floated) orientation about the rear float pivot axis FP' in a manner substantially identical to the first embodiment. In other words, the pedal 112 and the cleat 114 are configured such that the cleat 114 floats around the rear float pivot axis FP' for about three degrees in each direction as measured from a center longitudinal axis B' that passes through the rear float pivot axis FP'. Thus, a desired degree or angle θ' of float can be attained.

Even when the cleat 114 floats or rotates about the rear float pivot axis FP' relative to the pedal 112, the pedaling force center PFC' remains substantially aligned (or only slightly offset) from the rear float pivot axis FP' such that the cleat 114 does not accidentally disengage from the pedal 112 during pedaling. In other words, the forward pedaling force vector F' is applied substantially along both the rear float pivot axis FP' and the pedaling force center PFC'. Thus, effective pedaling power is achieved without disengagement.

As used herein, the following directional terms "forward, rearward, above, downward, vertical, horizontal, below and transverse" as well as any other similar directional terms refer to those directions of a bicycle equipped with a pedal of the present invention and when the pedal is horizontally oriented relative to the ground. Accordingly, these terms, as utilized to describe the present invention should be interpreted relative to a bicycle equipped with a pedal of the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle pedal assembly comprising:
    a bicycle pedal including
        a pedal shaft having a first end adapted to be coupled to a bicycle crank and a second end with a center rotation axis extending between said first and second ends,
        a pedal body rotatably coupled to said second end of said pedal shaft about said center rotation axis of said pedal shaft, said pedal body having a first end and a second end,
        a front clamping member coupled to said first end of said pedal body, said front clamping member having a front cleat engagement surface facing in a first direction, and a front pedal control surface with a curve center section, and
        a rear clamping member movably coupled to said second end of said pedal body to form a cleat receiving area between said front and rear clamping members, said rear clamping member having a rear cleat engagement surface facing in said first direction that is offset from said front cleat engagement surface and a rear pedal control surface; and
    a bicycle shoe cleat selectively engageable with said bicycle pedal via said front and rear clamping members, said cleat including
        a front attachment portion having a front coupling surface selectively engageable with said front cleat engagement surface of said front clamping member and a curved front cleat control surface, said curved center section of said front pedal control surface having a curvature at least about twice as large as said front cleat control surface,
        a rear attachment portion having a rear coupling surface selectively engageable with said rear cleat engagement surface of said rear clamping member and a rear cleat control surface, and
        a connecting portion connecting said front and rear attachment portions together,
    said rear control surfaces being arranged to prevent lateral movement of said rear attachment portion of said cleat relative to said rear clamping member to form a substantially stationary rear float pivot axis on a rear side of said center rotation axis prior to releasing movement of said rear clamping member when said cleat is coupled to said pedal within said cleat receiving area, said rear float pivot axis being substantially perpendicular to said rear cleat engagement surface,
    said front control surfaces being arranged such that said front attachment portion of said cleat is moveable laterally along said curved center section of said front pedal control surface about said rear float pivot axis from a center position in opposite lateral directions by a predetermined amount in each of said opposite lateral directions without laterally shifting said rear float pivot axis when said cleat is coupled to said pedal within said cleat receiving area, said front and rear control surfaces being further configured to form a front cleat release pivot axis on a front side of said center rotation axis, said cleat pivoting about said front cleat release pivot axis after said front attachment portion of said cleat moves said predetermined amount in at least one of said opposite lateral directions to cause releasing movement of said rear clamping member when said cleat is coupled to said pedal within said cleat receiving area.

2. The bicycle pedal assembly according to claim 1, wherein said front pedal control surface includes a pair of laterally spaced curved end sections connected by said curved center section, said curved center section having a radius of curvature at least twice as large as each of said curved end sections.

3. The bicycle pedal assembly according to claim 1, wherein said rear pedal control surface includes a rear pedal pivot surface configured to contact at least two points of a rear cleat pivot surface of said rear cleat control surface.

4. The bicycle pedal assembly according to claim 3, wherein said rear pedal pivot surface is a transverse surface that is formed by a cutout in said rear clamping member.

5. The bicycle pedal assembly according to claim 4, wherein said rear cleat pivot surface is a transverse surface that is formed by a projection extending upwardly from said rear coupling surface of said cleat.

6. The bicycle pedal assembly according to claim 5. wherein said rear pedal pivot surface is a discontinuous surface having at least two opposing flat sections.

7. The bicycle pedal assembly according to claim 6, wherein said rear pedal pivot surface includes an end section connecting said opposing flat sections.

8. The bicycle pedal assembly according to claim 7, wherein said rear cleat pivot surface is a convex curved surface arranged to contact each of said opposing sections and said end section of said rear pedal pivot surface when said cleat is coupled to said pedal within said cleat receiving area.

9. The bicycle pedal assembly according to claim 6, wherein said rear cleat pivot surface is a convex curved surface arranged to contact each of said opposing sections of said rear pedal pivot surface when said cleat is coupled to said pedal within said cleat receiving area.

10. The bicycle pedal assembly according to claim 9, wherein said rear cleat engagement surface includes a pair of engagement sections with said rear pedal pivot surface arranged therebetween.

11. The bicycle pedal assembly according to claim 3. wherein said front pedal control surface is a concave curved surface and said front cleat control surface is a convex curved surface.

12. The bicycle pedal assembly according to claim 11, wherein said concave front pedal control surface and said convex front cleat control surface are transverse surfaces extending from said front cleat engagement surface and said front coupling surface, respectively.

13. The bicycle pedal assembly according to claim 12, wherein at least one of said front pedal control surface and said front cleat control surface includes a pair of stop surfaces arranged to limit lateral movement of said front attachment portion of said cleat relative to said pedal.

14. The bicycle pedal assembly according to claim 3, wherein said rear pedal pivot surface is a transverse surface with a convex curved center section.

15. The bicycle pedal assembly according to claim 14, wherein said rear cleat pivot surface is a transverse surface with a concave curved center section.

16. The bicycle pedal assembly according to claim 3, wherein said front and rear cleat engagement surfaces are substantially parallel.

17. The bicycle pedal assembly according to claim 16. wherein said front cleat engagement surface lies in a plane closer to said center rotation axis than said rear cleat engagement surface.

18. The bicycle pedal assembly according to claim 1. wherein said front pedal control surface is a concave curved surface and said front cleat control surface is a convex curved surface.

19. The bicycle pedal assembly according to claim 18, wherein said concave front pedal control surface and said convex front cleat control surface are transverse surfaces extending from said front cleat engagement surface and said front coupling surface, respectively.

20. The bicycle pedal assembly according to claim 19, wherein at least one of said front pedal control surface and said front cleat control surface includes a pair of stop surfaces arranged to limit lateral movement of said front attachment portion of said cleat relative to said pedal.

21. The bicycle pedal assembly according to claim 1, wherein said front clamping member is non-movably coupled to said pedal body.

22. The bicycle pedal assembly according to claim 21, wherein said front clamping member is integrally formed with said pedal body as a one-piece, unitary member.

23. The bicycle pedal assembly according to claim 1, wherein said rear clamping member is pivotally coupled to said pedal body.

24. The bicycle pedal assembly according to claim 23, wherein said rear clamping member is normally biased toward an engaged position by a biasing member arranged between said pedal body and said rear clamping member.

25. The bicycle pedal assembly according to claim 24, wherein
said rear clamping member and said biasing member are mounted on a support pin that is coupled to said pedal body.

26. The bicycle pedal assembly according to claim 1, wherein
said pedal and said cleat are configured such that said rear float pivot axis remains substantially aligned with a pedaling force center when said cleat floats relative to said pedal around said rear float pivot axis to prevent accidental release of said cleat from said pedal.

27. The bicycle pedal assembly according to claim 26, wherein
said pedaling force center lies on said center rotation axis.

28. The bicycle pedal assembly according to claim 1, wherein
said pedal and said cleat are configured such that said cleat floats about three degrees relative to said pedal in each of said opposite lateral directions around said rear float pivot axis as measured relative to a center longitudinal axis of said pedal passing through said first and second ends of said pedal body and intersecting said rear float pivot axis when said cleat and said pedal are coupled together.

29. A bicycle pedal comprising:
a pedal shaft having a first end adapted to be coupled to a bicycle crank and a second end with a center rotation axis extending between said first and second ends;
a pedal body rotatably coupled to said second end of said pedal shaft about said center rotation axis of said pedal shaft, said pedal body having a first end and a second end;
a front clamping member coupled to said first end of said pedal body, said front clamping member having a front cleat engagement surface facing in a first direction and a front pedal control surface extending substantially perpendicular to said front cleat engagement surface, said front pedal control surface having a concave curved center section and a pair of concave curved end sections connected to each other by said curved center section, said curved center section having a radius of curvature at least twice as large as a radius of curvature of each of said curved end sections; and
a rear clamping member movably coupled to said second end of said pedal body, said rear clamping member having a rear cleat engagement surface facing in said first direction and a rear pedal control surface extending substantially perpendicular to said rear cleat engagement surface, said rear cleat engagement surface being offset from said front cleat engagement surface, said front and rear pedal control surfaces and said front and rear cleat engagement surfaces being configured to form a rear float pivot axis on a rear side of said center rotation axis and a front cleat release pivot axis on a front side of said center rotation axis.

30. The bicycle pedal according to claim 29, wherein
said rear clamping member is pivotally coupled to said pedal body for rotation about an axis substantially parallel to said center rotation axis.

31. The bicycle pedal according to claim 30, wherein
said rear clamping member is a rigid, non-wire member.

32. The bicycle pedal according to claim 30, wherein
said rear clamping member is normally biased toward an engaged position by a biasing member arranged between said pedal body and said rear clamping member.

33. The bicycle pedal according to claim 32, wherein
said rear clamping member and said biasing member are mounted on a support pin that is coupled to said pedal body.

34. The bicycle pedal according to claim 29, wherein
said rear float pivot axis is substantially perpendicular to said rear cleat engagement surface.

35. The bicycle pedal according to claim 34, wherein
said front release pivot axis is substantially perpendicular to said front cleat engagement surface.

36. The bicycle pedal according to claim 29, wherein
said front and rear cleat engagement surfaces are substantially parallel.

37. The bicycle pedal according to claim 36, wherein
said front cleat engagement surface lies in a plane closer to said center rotation axis than said rear cleat engagement surface.

38. The bicycle pedal according to claim 29, wherein
said front clamping member is non-movably coupled to said pedal body.

39. The bicycle pedal according to claim 38, wherein
said front clamping member is integrally formed with said pedal body as a one-piece. unitary member.

40. The bicycle pedal according to claim 29, wherein
said front and rear pedal control surfaces and said front and rear cleat engagement surfaces are configured with about three degrees of cleat float in each direction around said rear float pivot axis as measured relative to a center longitudinal axis passing through said first and second ends of said pedal body and intersecting said rear float pivot axis.

* * * * *